(12) United States Patent
Li et al.

(10) Patent No.: US 11,678,299 B2
(45) Date of Patent: Jun. 13, 2023

(54) METHOD AND USER EQUIPMENT FOR MULTI-CARRIER DATA TRANSMISSION

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd

( * ) Notice: Subject to any disclaimer, the term of this patent is extended or adjusted under 35 U.S.C. 154(b) by 241 days.

(21) Appl. No.: 16/492,877

(22) PCT Filed: Mar. 22, 2018

(86) PCT No.: PCT/KR2018/003383
§ 371 (c)(1),
(2) Date: Sep. 10, 2019

(87) PCT Pub. No.: WO2018/174610
PCT Pub. Date: Sep. 27, 2018

(65) Prior Publication Data
US 2020/0068534 A1 Feb. 27, 2020

(30) Foreign Application Priority Data

Mar. 24, 2017 (CN) .......................... 201710187208.2
Apr. 5, 2017 (CN) .......................... 201710219135.0
(Continued)

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04W 74/0808* (2013.01); *H04W 92/18* (2013.01)

(58) Field of Classification Search
CPC . H04W 72/02; H04W 74/0808; H04W 92/18; H04W 72/1231; H04W 52/243;
(Continued)

(56) References Cited

U.S. PATENT DOCUMENTS 8,112,094 B1 * 2/2012 Wellington ........... H04W 16/04
455/453
2008/0317152 A1 * 12/2008 Sun ....................... H04L 1/0013
375/261
(Continued)

FOREIGN PATENT DOCUMENTS

CN 101925181 12/2010
CN 105453672 3/2016
(Continued)

OTHER PUBLICATIONS

CATT ("Discussion on UE autonomous resource allocation in PC5-based V2V", 3GPP TSG RAN WG1 Meeting #84bis, R1-162267, Apr. 11-15, 2016) (Year: 2016).*
(Continued)

*Primary Examiner* — Chi H Pham
*Assistant Examiner* — Ji-Hae Yea
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present disclosure provides a method and a device for multi-carrier data transmission.

8 Claims, 9 Drawing Sheets

(30) Foreign Application Priority Data

| Jul. 31, 2017 | (CN) | 201710646381.4 |
| Oct. 10, 2017 | (CN) | 201710941620.9 |
| Oct. 27, 2017 | (CN) | 201711032621.8 |
| Feb. 12, 2018 | (CN) | 201710147892.6 |

(51) Int. Cl.
*H04W 74/08* (2009.01)
*H04W 92/18* (2009.01)

(58) Field of Classification Search
CPC ... H04W 52/262; H04W 72/04; H04W 72/12; H04W 72/1236; H04W 72/1242; H04W 72/1257; H04W 28/26; H04W 36/30; H04W 52/02; H04W 72/0453; H04W 72/085; H04B 17/318; H04B 17/345; H04L 5/0053; H04L 5/001; H04L 5/0044; H04L 5/0091
See application file for complete search history.

(56) References Cited

U.S. PATENT DOCUMENTS

| 2010/0208679 | A1 | 8/2010 | Papasakellariou et al. | |
| 2015/0215903 | A1 | 7/2015 | Zhao et al. | |
| 2015/0334735 | A1 | 11/2015 | Chang et al. | |
| 2015/0334760 | A1 | 11/2015 | Sartori et al. | |
| 2016/0057752 | A1* | 2/2016 | Ahn | H04W 56/004 370/329 |
| 2016/0183276 | A1 | 6/2016 | Marinier et al. | |
| 2018/0199181 | A1* | 7/2018 | Jung | H04W 8/005 |
| 2019/0182840 | A1* | 6/2019 | Feng | H04W 74/0816 |
| 2020/0107234 | A1* | 4/2020 | Kim | H04W 72/044 |
| 2021/0176740 | A1 | 6/2021 | Lee et al. | |

FOREIGN PATENT DOCUMENTS

| CN | 106165524 | 11/2016 | |
| WO | WO-2014029342 A1 * | 2/2014 | H04W 52/367 |
| WO | WO 2016/022009 | 2/2016 | |

OTHER PUBLICATIONS

Intel Corporation ("Transmitter behavior for sidelink resource (re)selection", 3GPP TSG RAN WG1 Meeting #86, R1-166512, Aug. 22-26, 2016) (Year: 2016).*
U.S. Appl. No. 62/472,593—Specification (Not in English) (Year: 2017).*
U.S. Appl. No. 62/472,593—Specification (English translated) (Year: 2019).*
U.S. Appl. No. 62/494,745—Specification (Not in English) (Year: 2017).*
U.S. Appl. No. 62/494,745—Specification (English translated) (Year: 2019).*
U.S. Appl. No. 62/474,629—Specification (Not in English) (Year: 2017).*
U.S. Appl. No. 62/474,629—Specification (English translated) (Year: 2019).*
Beijing Xinwei Telecom Techn., "Discussion on SA Decoding and Energy Measurement", R1-164984, 3GPP TSG RAN WG1 Meeting #85, May 23-27, 2016, 3 pages.
CATT, "Discussion on UE Autonomous Resource Allocation in PC5-based V2V", R1-162267, 3GPP TSG RAN WG1 Meeting #84bis, 5 pages.
European Search Report dated Dec. 20, 2019 issued in counterpart application No. 18772530.4-1219, 5 pages.
PCT/ISA/210 Search Report issued on PCT/KR2018/003383, pp. 3.
PCT/ISA/237 Written Opinion issued on PCT/KR2017/003383, pp. 5.
3GPP TS 36.213 V14.2.0, Mar. 23, 2017, 3rd Generation Partnership Project; Technical Specification Group Radio Access Network;. . . .
Evolved Universal Terrestrial Radio Access (E-UTRA); Physical layer procedures (Release 14), pp. 66.
Intel Corporation, 3GPP TSG RAN WG1 Meeting #86, R1-166511, Gothenburg, Sweden, Aug. 13, 2016,. . . .
"Sidelink measurements for V2V sensing and resource re-selection procedures", pp. 7.
Ericsson, 3GPP TSG-RAN WG2 #97, R2-1700932, Athens, Greece, Feb. 3, 2017, "Discussion on PC5 Multi-Carrier", pp. 6.
Samsung, 3GPP TSG-RAN WG2 #97, R2-1701355, Athens, Greece, Feb. 3, 2017, "V2X Multi-carrier operation: mode 4 operation enhancement", pp. 5.
European Search Report dated May 3, 2021 issued in counterpart application No. 21163650.1-1205, 7 pages.
Huawei, HiSilicon, "Details of Sensing Procedure and Resource (re)selection Triggering Mechanisms", R1-166169, 3GPP TSG RAN WG1 Meeting #86, Aug. 22-26, 2016, 6 pages.
Intel Corporation, "On Time Frequency Resources for SA Transmission", R1-143764, 3GPP TSG RAN WG1 Meeting #78bis, Oct. 6-10, 2014, 6 pages.
Chinese Office Action dated Oct. 21, 2022 issued in counterpart application No. 201810147892.6, 19 pages.

* cited by examiner

METHOD AND USER EQUIPMENT FOR MULTI-CARRIER DATA TRANSMISSION

PRIORITY

This application is a National Phase Entry of PCT International Application No. PCT/KR2018/003383 which was filed on Mar. 22, 2018, and claims priority to Chinese Patent Application Nos. 201710187208.2, 201710219135.0, 201710646381.4, 201710941620.9, 201711032621.8 and 201810147892.6, which were filed on Mar. 24, 2017, Apr. 5, 2017, Jul. 31, 2017, Oct. 10, 2017, Oct. 27, 2017 and Feb. 12, 2018, respectively, the content of each of which is incorporated herein by reference.

TECHNICAL FIELD

The present disclosure relates to wireless communication techniques, and more particular, to a method and a user equipment for multi-carrier data transmission.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as ""'sensing technology'"", ""'wired/wireless communication and network infrastructure'"", ""'service interface technology'"", and ""'Security technology'"" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the Long Term Evolution (LTE) based V2X (Vehicle to Vehicle/Perdestrian/Infrastructure/Network) system of the 3GPP Standardization Organization, there are two structures of configuring a Physical Sidelink Control Channel (PSCCH) resource pool and a Physical Sidelink Share Channel (PSSCH) resource pool. The PSCCH may be in the same sub-frame as one of PSSCHs it is schedules; or the PSCCH may not be in the same sub-frame as any of PSSCHs it schedules. The PSCCH resource pool and the PSSCH resource pool occupy the same set of sub-frames. A PSCCH is constantly mapped to two Physical Resource Blocks (PRBs). The allocation granularity of frequency resource is a sub-channel. A sub-channel contains a number of continuous PRBs, whose number is configured by higher layer signaling. The resources of a device may occupy one or more continuous sub-channels. PSCCH and PSSCH can occupy continuous PRBs when the PSCCH and the PSSCH are in the same sub-frame. In the case where the resources of the device occupy one or more continuous subchannels, two PRBs (e.g., two of the lowest frequency PRBs) are used to carry the PSCCH while the other PRB(s) is used to carry the PSSCH. The number of PRBs that PSSCH actually occupies also needs to be a power of 2, 3, and 5. When the PSCCH and the PSSCH are located in the same sub-frame, the PRB of the PSCCH and the PRB of the PSSCH may also be discontinuous. In this case, the start PRB location of the PSCCH resource pool and the PSSCH resource pool may be configured, respectively. The PSSCH resource pool still allocates resources in the granularity of the subchannels. For a device, the index of the PSCCH it occupies is equal to the minimum subchannel index of the occupied PSSCH.

In the V2X system, the collision problem and the problem of in-band leakage may be addressed based on sensing. One of the basic assumptions is that occupancy of resources by a device is based on semi-persistent scheduling (SPS). That is, the resources occupied by the device are periodic over a period of time. As shown in FIG. 1, the time at which the device selects the PSCCH/PSSCH resource is the sub-frame n. The device first detects resources in the resource pool in the time period from the sub-frame n−a to the sub-frame n−b, to determine which time-frequency resources are occupied and which time-frequency resources are idle; then selects the PSCCH/PSSCH resource in the sub-frame n, such that the PSCCH is to be transmitted in the sub-frame n+c, the PSSCH is to be transmitted in the sub-frame n+d, and the reserved resource is in the sub-frame n+e. Then, the PSCCH is transmitted in the sub-frame n+c, the PSSCH is transmitted in the sub-frame n+d, and the next PSSCH is transmitted in the reserved resource (i.e., in the sub-frame n+e). In particular, when c is equal to d, the PSCCH and the PSSCH are located in the same sub-frame. The interval between the sub-frame n+e and the sub-frame n+d is equal to a reservation interval P. The reservation interval P is equal to $P_{step} \cdot k \cdot P_{step}$ is, for example, equal to 100, that is, a latency of no more than about 100 ms. k may be in a range of a set of all integers from 1 to 10 or a subset thereof, and may be configured by higher layer. In the resource selection, the device may select resources of K different sub-frames. That is, each data may be repeatedly transmitted K times, where K is greater than or equal to 1, for example k is equal to 2, thus avoiding the case that a portion of the devices cannot receive the data due to the half-duplex operation. When K is greater than 1, each PSSCH may indicate all of the k resources. A device can detect resources in its resource pool in two ways. One is to obtain accurate information about the PSSCH occupied channel scheduled by the PSCCH based on decoding the PSCCH of other devices, so that the received power of the corresponding device can be measured. The resource occupancy and/or reservation can be determined based on the received power and the reservation interval in the PSCCH. The other is to determine the resource occupancy and/or reservation based on the received energy. The received energy is, for a resource on the sub-frame x in the selection window, an average of the received energy of the same subchannel resource on the sub-frame $x-P_{step} \cdot j$ in the sensing window, and j is an arbitrary integer. Based on the two methods, a device should avoid occupying the same resources for transmission as other devices as much as possible.

FIG. 2 is a diagram of a resource selection method based on sensing. Assuming that the resource selection is performed in sub-frame n, the reservation interval of the currently reserved resource of the device is $P_A$, and the number of cycles that need the reserved resource is C. The device may select resources in the selection window $[n+T_1, n+T_2]$ and reserve C cycles consecutively at interval $P_A \cdot T_1$ and $T_2$ depend on the implementation of the UE, for example $T_1 \leq 4$ and $20 \leq T_2 \leq 100$. $T_1$ depends on the effect of the processing delay from the time the UE selects resources to the time that the UE can begin to transmit scheduling assignment signaling (SA) and data. $T_2$ primarily depends on the latency characteristics that the current traffic can tolerate. First, all the resources in the selection window are included in a set $S_A$ (201). Next, based on the correctly received SA, the received power of the data channel scheduled by SA is measured, where it is assumed that the SA indicates that the resource continues to be reserved after the sub-frame n. A portion of the candidate resource is excluded (202) when the received power exceeds a corresponding threshold. Specifically, when the received power exceeds the corresponding threshold, the resource Y after the sub-frame n that is reserved by SA is not available. The threshold is jointly determined based on the priority of the device that performs the resource selection and the priority of the correctly received SA. $R_{x,y}$ denotes a single sub-frame resource in the selection window $[n+T_1,n+T_2] \cdot R_{x,y}$ is located in the sub-frame y and contains one or more consecutive subchannels starting from the subchannel x. When the PRB of $R_{x,y+j \cdot P_A}$ overlaps the PRB of the resource Y, $R_{x,y}$ is not available to device A. that is, $R_{x,y}$ is excluded from the set $S_A$, where j=0, 1, ... C−1, and C is the number of cycles in which device A currently needs to reserve resources by cycle $P_A$. Next, it is determined whether the remaining resource of $P_A$ reaches a ratio R of the total resource or not, for example, 20% (203). If the ratio is less than R, the threshold is increased by 3 dB (204) and step 201 is executed again; otherwise, it proceeds to step 205. In step 205, the received energy of the remaining resources of $S_A$ is estimated, and the resource with the least amount of received energy is moved to the set $S_B$, until the ratio of the resources $S_B$ reaches R. For a resource containing a plurality of subchannels, the received energy of the resource is the an average of the received energy on the respective subchannels it contains. Next, the resource for data transmission is selected from the resource of $S_B$ (206) and used for data transmission (207). Here, when a data is transmitted twice, the UE first selects a resource for data transmission in $S_B$, and then, if there is an available resource within the indication range of the SA and satisfying the latency requirement, the UE selects another resource for data transmission.

In the V2X system, in the resource selection method based on sensing, after the UE has selected and reserved resource(s), the number of times the UE can transmit data using the resource is recorded as S and S is a random number. When the number of times the UE can transmit data using the resource reaches S times, the resource selection of the UE can be triggered again. In addition, the resource selection can also be triggered in some other cases. For example, if the UE fails to transmit data on N consecutive reserved resources, or if the UE fails to transmit data for a period of time t, the UE triggers the resource reselection. Alternatively, if the currently reserved resource is not suitable for transmitting the current data, for example, the amount of the current data exceeds the carrying capacity of the reserved resource, or the currently reserved resource cannot satisfy the latency requirement of data transmission, etc. it also causes the UE to trigger the resource reselection.

DISCLOSURE OF INVENTION

Technical Problem

In order to enhance the performance of the V2X system, it needs to increase the data transfer rate of the V2X system. How to effectively enable a UE to execute data transmission in a number of carriers is an urgent problem to be solved.

Solution to Problem

The present application provides a method and a user equipment for multi-carrier data transmission, which provides a mechanism for performing resource selection, setting a transmission power and transmitting data on a plurality of carriers, thereby improving the transmission performance of the UE.

In order to achieve the object, the present application provides a method for multi-carrier data transmission performed by a user equipment UE, comprising:

detecting scheduling assignment signaling SA of another UE within a sensing window of each of a plurality of carriers;

measuring a received power of a scheduled data channel based on the SA;

detecting a received energy of each subchannel of each sub-frame in the sensing window;

selecting a resource for data transmission on the plurality of carriers based on the SA, the received power, and the received energy; and using the selected resource for data transmission.

In order to achieve the object, the present application provides a user equipment (UE) for multi-carrier data transmission, including a detection module, a resource selection module and a transceiver module, wherein:

the detection module is configured to detect a scheduling assignment signal SA of another UE in a sensing window of each of a plurality of carriers, measure a received power of a scheduled data channel based on the SA, and detect a received energy of each subchannel of each sub-frame in the sensing window;

the resource selection module is configured to select a resource for data transmission on the plurality of carriers based on the SA, the received power, and the received energy;

the transceiver module is configured to perform data transmission by using the selected resource.

According to the method and the user equipment of the disclosure, the flexibility of resource selection is increased and the data transmission performance of the UE is improved.

Advantageous Effects of Invention

The present application provides a method and a user equipment for multi-carrier data transmission, which provides a mechanism for performing resource selection, setting a transmission power and transmitting data on a plurality of carriers, thereby improving the transmission performance of the UE.

According to the method and the user equipment of the disclosure, the flexibility of resource selection is increased and the data transmission performance of the UE is improved.

BRIEF DESCRIPTION OF DRAWINGS

The foregoing features and advantages of the present disclosure will become more apparent from the following detailed description of the disclosure taken in conjunction with the accompanying drawings in which.

MODE FOR THE INVENTION

Figure 1:
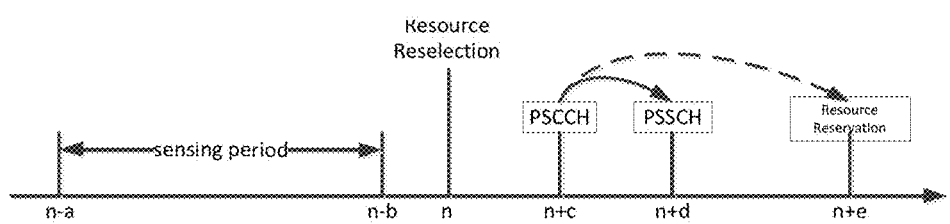
FIG. 1 is a schematic diagram showing a method of resource selection based on sensing.

Preferred embodiments of the present disclosure will now be described in detail with reference to the accompanying drawings. In the drawings, the same reference numerals shown in different drawings are used to designate the same or similar components. For clarity and conciseness, a detailed description of the known functions and structures contained herein will be omitted to avoid obscuring the subject matter of the present disclosure.

In order to make the objects, technical solutions and advantages of the present disclosure more clear, the present disclosure will be described in detail with reference to the accompanying drawings.

In V2X communication, the participating UEs can be classified into a variety of types, such as vehicles (VUEs), pedestrians (PUEs), and roadside units (RSUs). It is assumed that the data transmission mechanism of a UE is as follows. First, the UE transmits a control channel (hereinafter referred to as scheduling assignment signaling (SA)) for indicating the coding modulation scheme (MCS) and the time-frequency resource occupied by the data channel. The UE transmits data on the scheduled data channel thereafter. For LTE D2D/V2X systems, the SA is also called PSCCH, and the data channel is also called PSSCH. For a device, since its data is generated periodically over a period of time, the device can reserve resources periodically according to a specific reservation interval; and, each data may be transmitted repeatedly K times, accordingly it requires to reserve K resources, where K is greater than or equal to 1, so as to avoid the case that a part of the devices cannot receive the data due to the half-duplex operation. In order to increase the transmission rate of the UE and enhance the transmission performance, the UE may select resources and transmit data on a plurality of carriers.

In step 301, scheduling assignment signaling SA of another UE is detected within a sensing window of each of a plurality of carriers, a received power of a scheduled data channel is measured based on the SA, and a received energy of each subchannel of each sub-frame is detected.

In step 302, a resource for data transmission is selected on the plurality of carriers based on the detected SA, the received power, and the received energy.

The resource selection on a plurality of carriers may be performed independently or may be operated jointly to better coordinate the data transmission over multiple carriers. In addition, depending on the measurement of the congestion control, a portion of the resources selected on the plurality of carriers may be discarded, i.e., not used to transmit data, thereby reducing system interference levels.

In step 303, the selected resource is used for data transmission.

For example, the UE may set the SA and the transmission power of a corresponding data channel, transmit the SA to indicate the selected resource, and transmits data over the resource.

The transmission power of a data channel corresponding to the SA on the different carriers may be set independently or may be jointly set to better coordinate the data transmission over multiple carriers.

In the following, the resource selection process and the data transmission on a plurality of carriers according to the present disclosure will be described in detail in accordance with the following specific embodiments provided by the present disclosure.

First Embodiment

Assuming that the UE can perform data transmission on N carriers, and the N carriers may be perfectly equal to each other. When the UE has relatively small traffic, the UE may choose to use a carrier or a portion of the carrier at the same probability. Alternatively, it is assumed that the UE can perform data transmission on N carriers, and the UE uses the N carriers for data transmission in a specific priority order. When the UE has relatively small traffic, the UE may preferentially use a specific carrier. For example, the carrier is similar to the primary carrier of the LTE CA system. When the traffic of the UE is increased, the UE can add other carriers that can be used in a certain order. The order of adding carriers may be pre-defined, configured by higher level signaling or pre-configured. For example, the UE may preferentially use a carrier with a smaller carrier index according to indexes of the carriers and add additional carriers for data transmission in the order of increasing the index when the traffic increases.

When the UE can perform data transmission on N carriers, in the case that the UE performs resource selection on one sub-frame, the UE may select resources only on M carriers, M being less than or equal to N, and it is necessary to determine the transmission parameters of each carrier. For example, the transmission parameter may be a reservation interval on a specific carrier, a modulation scheme, a number of occupied consecutive subchannels, a number of transmissions, and a traffic priority. The transmission parameters on the M carriers may be the same or different.

A first multi-carrier resource selection method is as follows. The UE first determines a resource selection scheme, i.e., selecting M carriers out of the N carriers and further determining the transmission parameters of the i-th carrier, for example, including a number $n_i$ of occupied continuous subchannels and a traffic priority i=0, 1, M−1. The traffic priorities of the M carriers may be the same or different. Next, the UE selects channel resources based on the transmission parameters of the respective carriers according to the detection results on the M carriers, For example, selecting a number $n_i$ of continuous subchannel on the i-th carrier. The selection of the M carriers and the transmission parameters of each carrier may be determined according to some other conditions, such as the amount of traffic currently required to be transmitted and the congestion level of each carrier, etc. Assuming that the UE needs to transmit traffic having multiple priorities, the UE may determine the priority parameters for resource selection of a carrier according to the priority of the traffic to be transmitted on the carrier. The present disclosure does not limit the specific determination method, and the metric of the congestion level may be a channel busy proportion (CBR). The resource selection of the UE on the M carriers may be performed independently or may be jointly operated to better coordinate the data transmission over multiple carriers. In particular, assuming that M is constantly equal to N, the UE only needs to determine the transmission parameters for each carrier of the N carriers.

Since the relative positions between UEs in one region change and the position change is relatively fast when the vehicle speed is relatively high, and the traffic on each carrier also change, the UE may not be able to accurately determine the M carriers that are currently suitable for transmission and the transmission parameters of each carrier, for example, including a number of occupied consecutive sub-channels and the traffic priority.

Figure 4:
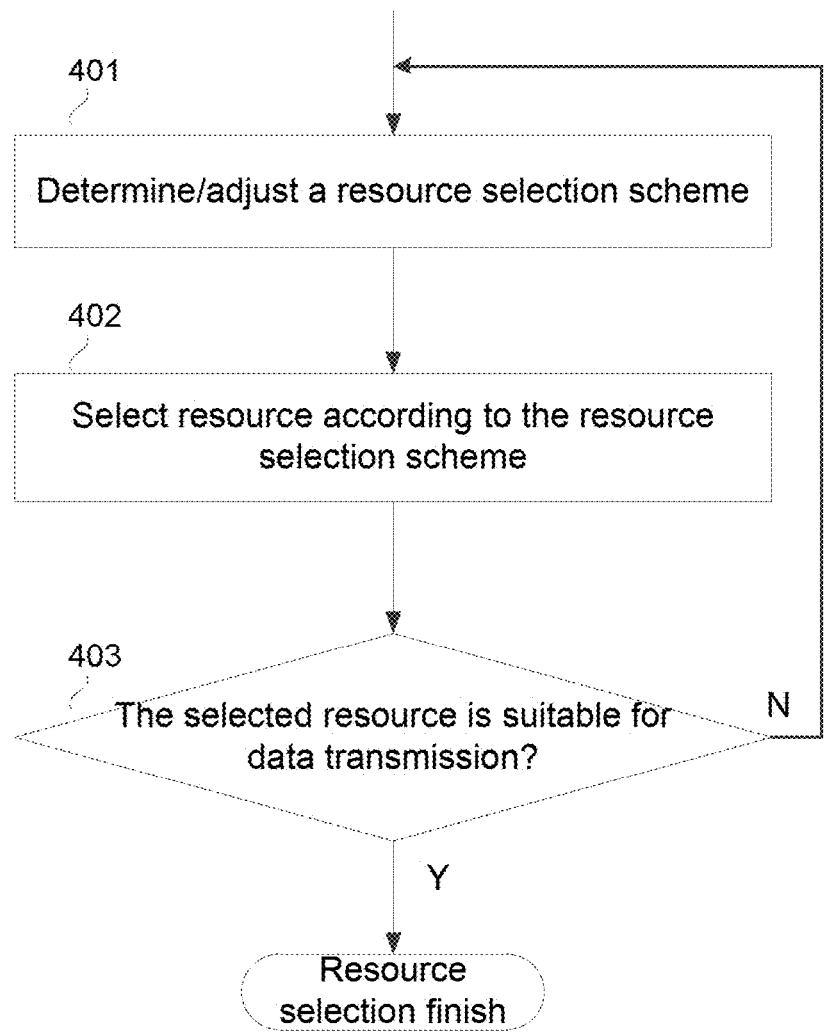
FIG. 4 is a flow chart of another method of resource selection on one or more carriers according to an embodiment of the present disclosure.

As shown in FIG. 4, a second multi-carrier resource selection method may be as follows. The UE may first determine a resource selection scheme (401), and then select the resource (402) using the first multi-carrier resource selection method. The UE may also determine whether the resources selected on the M carriers and the corresponding transmission parameters are suitable for data transmission (403). If the selected resource is not suitable for transmission, the UE may adjust the resource selection scheme, i.e., adjust carriers selected on the N carriers and the corresponding transmission parameters, and trigger the resource selection again. The method for determining whether the selected resource is suitable for transmission may include using at least one of the following parameters: 1) whether the PSSCH-RSRP threshold is increased when it is determined whether or not the resource is available based on the PSSCH-RSRP of the data channel scheduled by the received SA and/or the times of increasing the PSSCH-RSRP threshold; 2) the ratio of the number of remaining resources to the total number of resources when it is determined whether the resource is available based on the PSSCH-RSRP of the data channel scheduled by the received SA; 3) the maximum or average value of the S-RSSI of the resources reserved according to the average received energy (S-RSSI) of each subchannel; 4) S-RSSI of the selected resources; 5) the number of selected resources, which number is less than or equal to K. The present disclosure does not limit the specific method of determining whether the selected resource is suitable for transmission.

Figure 5:
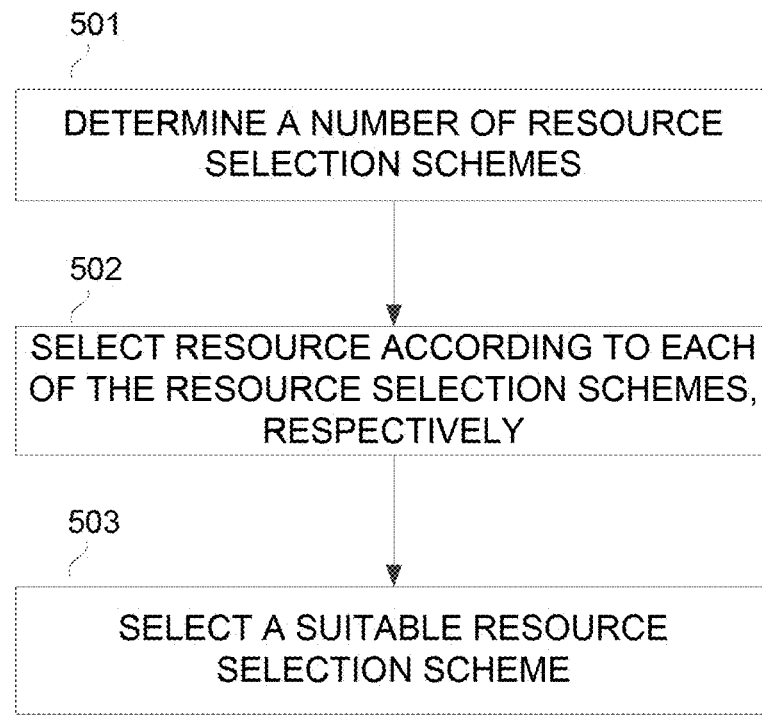
FIG. 5 is a flow chart of another method of resource selection on one or more carriers according to an embodiment of the present disclosure.

As shown in FIG. 5, a third multi-carrier resource selection method is as follows. The UE first determines a number P of resource selection schemes (501), where P is greater than or equal to 1, and each scheme includes a plurality of selected carriers and transmission parameters of each selected carrier. Then the UE performs resource selection (502) based on the selected carriers and its transmission parameters of each scheme, respectively, according to the detection results on the respective carriers. Then the UE compares the schemes and selects suitable one (503). Comparing the number P of resource selection schemes includes using at least one of the following parameters: 1) whether the PSSCH-RSRP threshold is increased when it is determined whether or not the resource is available based on the PSSCH-RSRP of the data channel scheduled by the received SA and/or the times of increasing the PSSCH-RSRP threshold; 2) the ratio of the number of remaining resources to the total number of resources when it is determined whether the resource is available based on the PSSCH-RSRP of the data channel scheduled by the received SA; 3) the maximum or average value of the S-RSSI of the resources reserved according to the average received energy (S-RSSI) of each subchannel; 4) S-RSSI of the selected resources; 5) the number of selected resources, which number is less than or equal to K. The present disclosure does not limit the specific method of comparing the number P of resource selection schemes. It is assumed that the p-th scheme includes a number $M_p$ of carriers to be selected and transmission parameters of the i-th selected carrier, for example, including the number $n_{i,p}$ of occupied consecutive subchannels, traffic priority, etc., i=0, 1, $M_p$−1. The traffic priorities of the $M_p$ carriers may be the same or different. The number P of candidate resource selection schemes, the selected $M_p$ carriers of each scheme, and the transmission parameters on each carrier can be determined according to some other criteria, for example, the traffic required to be transmitted and the congestion level of each carrier. The present disclosure does not limit the specific determination method. For each resource selection scheme, the resource selection on the $M_p$ carriers may be performed independently or may be operated jointly to better coordinate the data transmission over multiple carriers. In particular, assuming that M is constantly equal to N, the same carrier is used for the P resource selection schemes, but the transmission parameters of the respective carriers may not be exactly the same.

Second Embodiment

Figure 6:
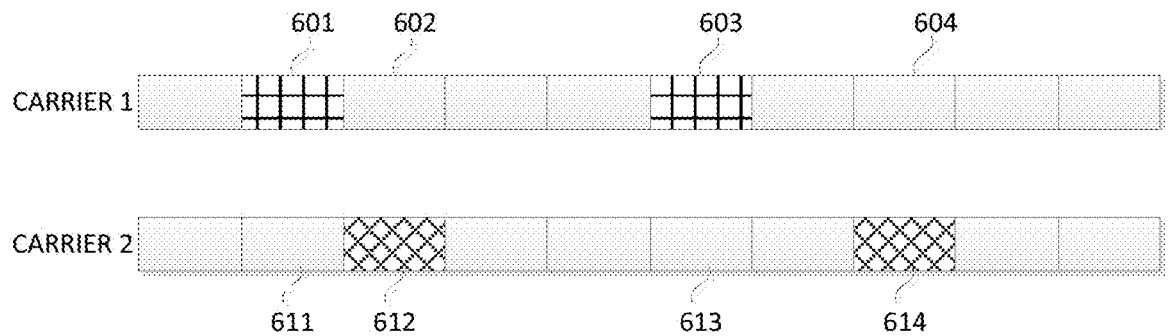
FIG. 6 is a schematic diagram of a half-duplex operation performed on a plurality of carriers according to an embodiment of the present disclosure.

When the UE performs detection in the sensing window of a plurality of carriers, selects channel resources and conducts data transmission, a limiting factor is a half-duplex operation. Specifically, when the UE conducts transmission on a sub-frame of a carrier, the UE cannot perform a reception operation on the sub-frame of the carrier, and the UE cannot perform a reception operation on the sub-frame of an adjacent carrier. As shown in FIG. 6, it is assumed that the UE transmits data by using two adjacent carriers, i.e., data is transmitted on sub-frames 601 and 603 of carrier 1, and data is transmitted on sub-frames 612 and 614 of carrier 2. Due to the half-duplex limitation, the UE cannot perform the detection on sub-frames 602 and 604 of carrier 1 and on sub-frames 611 and 613 of carrier 2. Since the UE cannot perform the detection on the sub-frames 602, 604, 611, and 613, sub-frames within the selection window corresponding to these sub-frames cannot be used for data transmission of the UE, thereby reducing the number of resources available for selection within the selection window. This increases the collision probability between UEs to a certain extent.

In order to avoid the half-duplex problem as shown in FIG. 6, when it performs a resource selection on a plurality of carriers, the resources selected for the respective carriers may be located within the same sub-frame. When data is transmitted a plurality of times (including initial transmission and retransmission), the resources for the initial transmission and retransmission on the plurality of carriers are located within the same sub-frame, respectively. It is assumed that the plurality of carriers allocate resource pools for data transmission, respectively. If the sets of sub-frames from the resource pools of the plurality of carriers are identical, the resources may be selected from all sub-frames of the resource pool. Alternatively, if the sets of sub-frame from the resource pools of the plurality of carrier are not identical, resources may be only selected from the intersection of the sets of sub-frames of the resource pools of the plurality of carriers so that the resources selected on the plurality of carriers are located in the same sub-frames. It is assumed that the sets of sub-frames of the resources that can be selected on the plurality of carriers are denoted by B. The UE performs detection on a plurality of carriers, including receiving the SA and measuring the received power of the data channel scheduled by the correctly received SA, and measuring the received energy of each subchannel. Next, the UE may conduct the resource selection based on the detection of the resources on the sub-frame within the set B.

Figure 7:
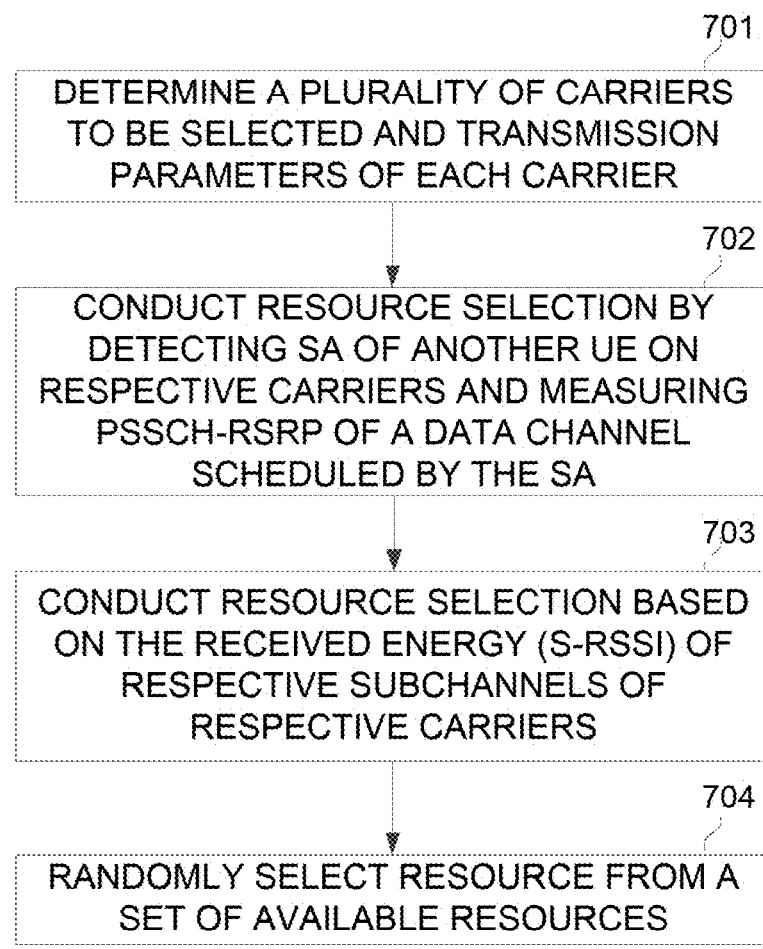
FIG. 7 is a flow chart of another method of resource selection on one or more carriers according to an embodiment of the present disclosure.

As shown in FIG. 7, the UE first determines M carriers to be selected and the transmission parameters of each carrier (701). For example, if the method of the first embodiment is used, the M carriers and the transmission parameters of each carrier are obtained for a resource selection scheme. It is assumed that the number of subchannels of the resource to be selected on the i-th carrier is $n_i$, the priority is $r_i$, i=0, 1, M−1, and M is the number of carriers on which the UE performs data transmission. A combined resource may include M resources and correspond to the M carriers. The resource corresponding to the i-th carrier contains a number n, of consecutive subchannels. If the number of resources composed of n, consecutive subchannels contained in one sub-frame of the i-th carrier is $N_i$, the total number of resources in the combined resource in one sub-frame is $$\prod_{i=0}^{N_{CC}-1} N_i,$$

in which $\Pi(\ )$ represents the multiplication operation.

Assuming that the total number of sub-frames within the set B is $N_B$, the total number of resources in the combined resource in the set B is $$N_B \cdot \prod_{i=0}^{N_{CC}-1} N_i.$$

The UE may then conduct the resource selection by detecting SA of another device on each carrier and the PSSCH-RSRP of the data channel scheduled by the SA (702).

Figure 2:
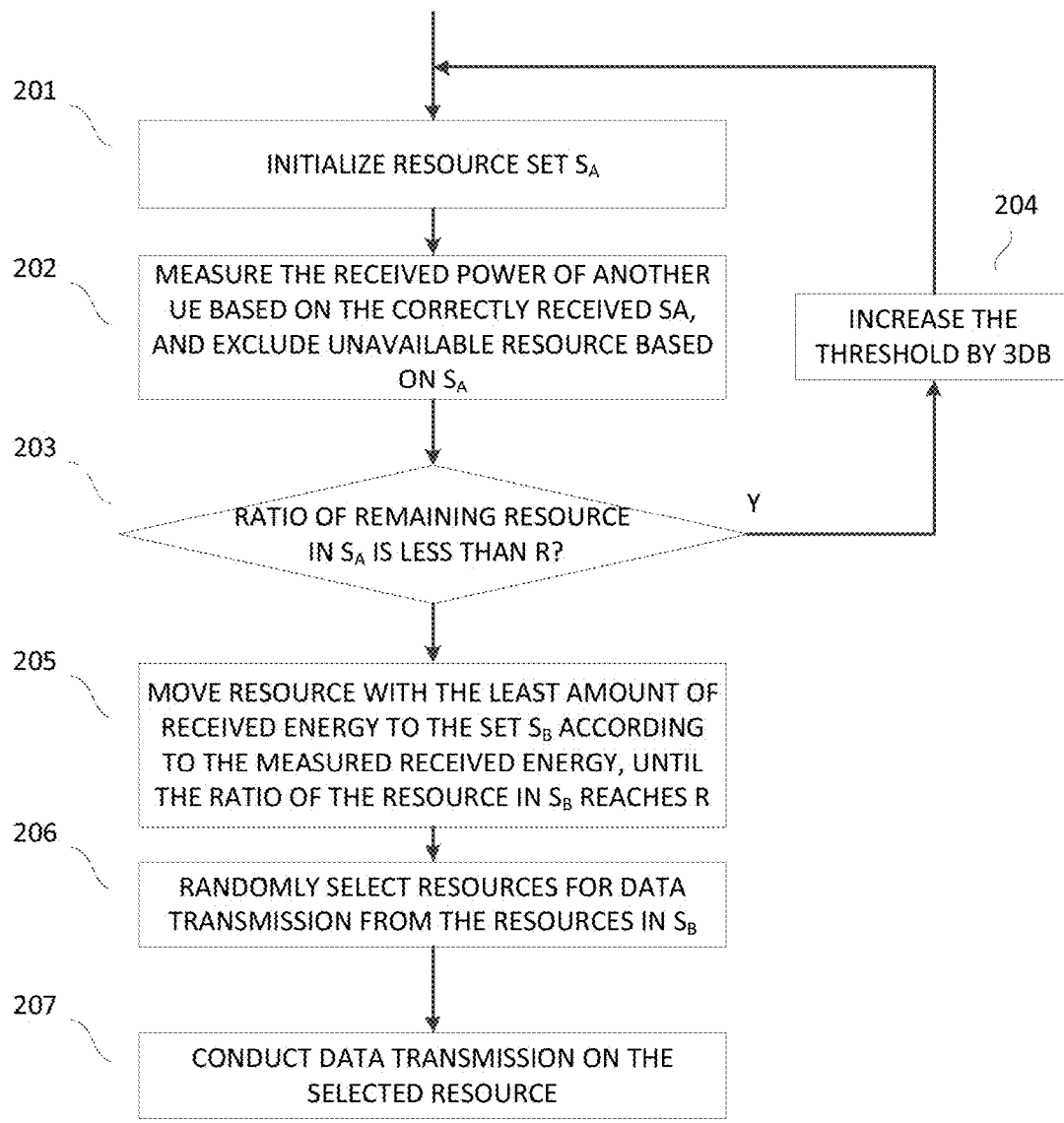
FIG. 2 is a flow chart of a method of resource selection based on sensing.
Figure 3:
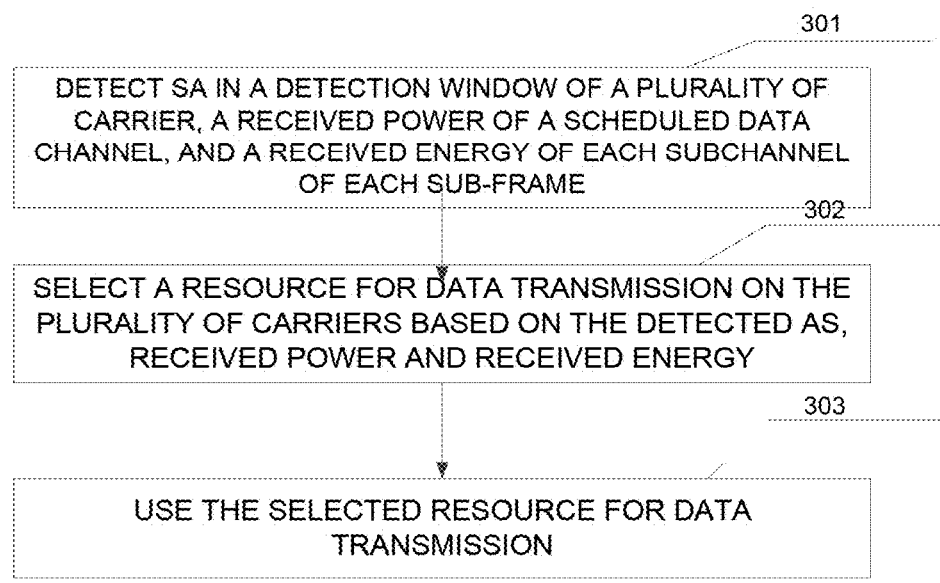
FIG. 3 is a flow chart of a method of resource selection on one or more carriers according to an embodiment of the present disclosure.

For the i-th carrier, assuming that a resource contains n, consecutive subchannels and the priority is $r_i$, it is possible to exclude the unavailable resources for each carrier independently according to the detection of SA of the other device. For example, based on step 202 of the resource selection method of FIG. 2, it is assumed that the UE detects the SA of the other device and resource Y is scheduled or reserved by the SA, and $R_{x,y}$ represents a resource of a single sub-frame in the selection window and is located in the sub-frame y, and contains one or more consecutive subchannels starting from the subchannel x. When $R_{x,y+j \cdot P_A}$ overlaps the resource Y and the received power of the resource scheduled by the SA exceeds the PSSCH-RSRP threshold, where j is a non-negative integer, $R_{x,y}$ is unavailable to device A. According to the method, for the i-th carrier, when the ratio of the remaining available resources is lower than the threshold $R_i$, the threshold may be increased and the process of excluding resources is executed repeatedly until the ratio of the remaining available resources is no lower than $R_i$. For example, the PSSCH-RSRP threshold is increased by a step of 3 dB based on the resource selection method of FIG. 2. The threshold $R_i$ may be a fixed value, for example, 20%, or the threshold $R_i$ may be configured for each carrier, respectively, or the threshold $R_i$ may be determined for each carrier based on the amount of traffic to be transmitted currently and the load of each carrier, respectively. According to the method, for a sub-frame in the set B, there is no available combined resource within this sub-frame if there is no available resource on at least one carrier.

Alternatively, for the set B, it is also possible to directly determine whether the combined resource is available. For example, on a carrier, it is assumed that the UE detects SA of the other device and resource Y is scheduled or reserved by the SA, and $R_y$ represents a combined resource of a single sub-frame in the selection window and is located in the sub-frame y. When $R_{y+j \cdot P_A}$ overlaps the resource Y and the received power of the resource scheduled by the SA exceeds the PSSCH-RSRP threshold, j being a non-negative integer, $R_y$ is unavailable to device A According to the method, the PSSCH-RSRP threshold on each carrier can be increased at the same time when the ratio of the remaining available combined resources is below the threshold R, and the process of excluding resources is executed repeatedly until the ratio of the remaining available resources is no lower than the threshold R. For example, the PSSCH-RSRP threshold is increased by a step of 3 dB based on the resource selection method of FIG. 2. The threshold R may be a fixed value, for example, 20%, or the threshold R may be configured by the higher layer signaling, or the threshold R may be determined based on the amount of traffic to be transmitted currently and the load of each carrier.

Next, the UE may conduct the resource selection according to the received energy (S-RSSI) of each subchannel on each carrier (703). For the combined resource, the combined S-RSSI corresponding to the combined resource may be calculated from the S-RSSI corresponding to the resources on each carrier. For example, the S-RSSI of the resources on each carrier may be weighted according to the number n, of subchannels of the resources on each carrier, i.e., the combined S-RSSI is equal to $$\sum_{i=0}^{N_{CC}-1}(n_i \cdot SRSSI_i) \Big/ \sum_{i=0}^{N_{CC}-1}(n_i).$$

The present disclosure does not limit the method of obtaining a combined S-RSSI. For the remaining combined resources of the set B after step 702, the combined resource with the smallest combined S-RSSI is moved to the set $S_B$ until the ratio of the combined resources of $S_B$ is $R_2$. The threshold $R_2$ may be a fixed value, for example, 20%, or the threshold $R_2$ may be configured by the higher layer signaling, or the threshold $R_2$ may be determined based on the amount of traffic to be transmitted currently and the load of each carrier. The threshold $R_2$ may be the same as or different from the threshold R selected in conducting the resource selection based on the SA and the received power.

Finally, the UE randomly selects the combined resource for data transmission in the combined resource of the set $S_B$(704).

In the method of performing a resource selection on M carriers shown in FIG. 7, before the resource selection is performed, the UE determines whether the resource of the M carrier that is currently selected shall be kept or shall be re-selected according to a specific probability p. The UE may generate a count value C and the resources selected by the UE on each carrier are reserved for C cycles consecutively.

Third Embodiment

When transmitting data over N carriers, the following solution can also be used to increase the flexibility of the resource allocation and reduce collisions and interference between UEs. When it is necessary to select a plurality of carriers in the same sub-frame, the configuration flexibility of the set of sub-frames of the resource pools of the respective carriers may be limited. When two UEs collide with each other on a sub-frame of one carrier, the probability of collision on other carriers is high since the two UEs occupy the same sub-frame on other carriers. In order to improve the flexibility of resource allocation and resource selection and take into account the effects of collision, interference and half-duplex operation, another method of selecting resources on a plurality of carriers is described below.

The UE performs detection on a plurality of carriers, including receiving the SA and measuring the received power of the data channel scheduled by the correctly received SA, and measuring the received energy of each subchannel. Next, the UE may exclude the unavailable resources for each carrier according to the detection result. The resources selected on each carrier may be determined independently; alternatively, when selecting a resource, it may preferentially select resources located in the same sub-frame for the plurality of carriers.

Figure 8:
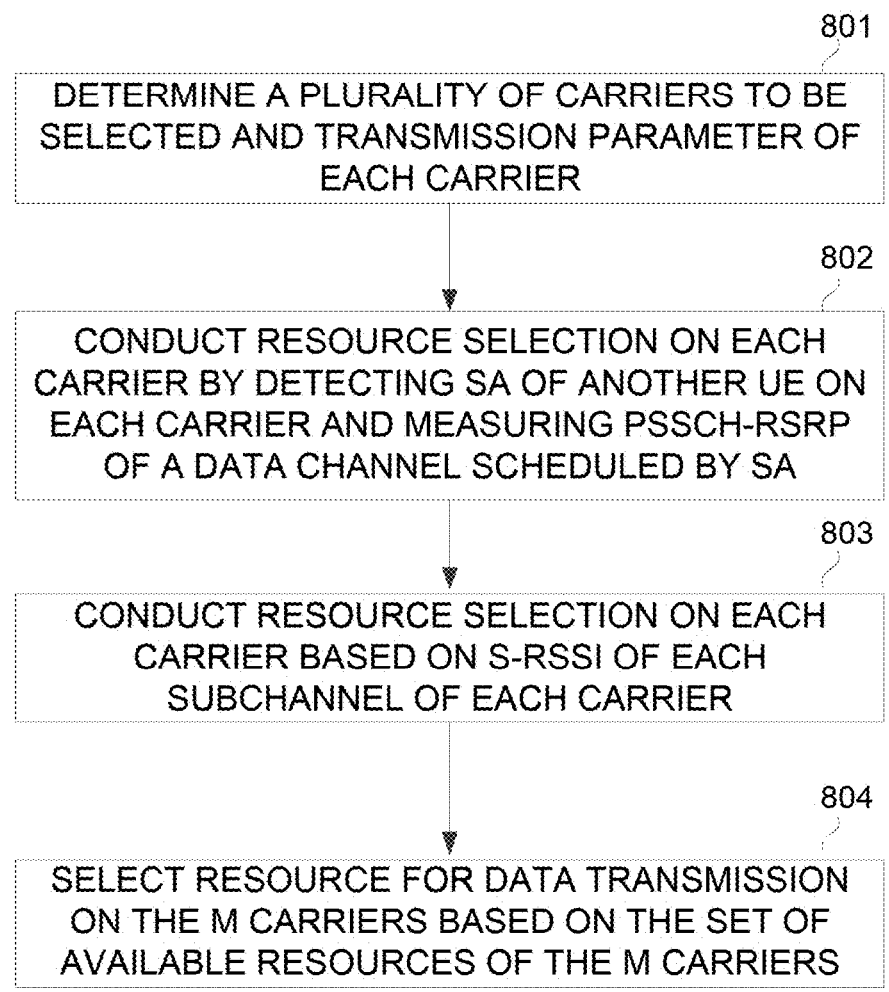
FIG. 8 is a flow chart of another method of resource selection on one or more carriers according to an embodiment of the present disclosure.

As shown in FIG. 8, the UE first determines M carriers to be selected and the transmission parameters of each carrier (801), where M is greater than or equal to one. For example, if the method of the first embodiment is used, the M carrier and the transmission parameters of each carrier are obtained for a resource selection scheme. Alternatively, the UE may perform the resource selection only on a portion of the carriers, and the selected and reserved resources on the other portion of the carriers are still in use. In such a case, the M carriers belong to the portion of the carriers from which the resource is to be selected currently. The number of subchannels of the resource to be selected on the i-th carrier is $n_i$, the priority is $r_i$, i=1=0,1,M−1, and M is the number of carriers on which the UE performs the resource selection.

The UE may then detect the SA of the other device on each carrier, measure the PSSCH-RSRP of the data channel scheduled by the SA, and perform resource selection on each carrier, respectively (802). For example, according to step 202 of the resource selection method of FIG. 2, for the i-th carrier, assuming that a resource contains $n_i$ consecutive subchannels and the priority is $r_i$, it is possible to exclude the unavailable resources according to the SA and PSSCH-RSRP of the other device. According to the method, for the i-th carrier, when the ratio of the remaining available resources is lower than the threshold $R_i$, the PSSCH-RSRP threshold may be increased and the process of excluding resources is executed repeatedly until the ratio of the remaining available resources is no lower than $R_i$. For example, the PSSCH-RSRP threshold is increased by a step of 3 dB based on the resource selection method of FIG. 2. The threshold $R_i$ may be a fixed value, for example, 20%, or the threshold $R_i$ may be configured for each carrier, respectively, or the threshold $R_i$ may be determined for each carrier based on the amount of traffic to be transmitted currently and the load of each carrier, respectively.

Next, the UE may perform the resource selection for each carrier according to the received energy (S-RSSI) of each subchannel on each carrier (803). For example, according to step 205 of the resource selection method of FIG. 2, for the i-th carrier, assuming that a resource contains $n_i$ consecutive subchannels, the resource with the smallest S-RSSI in accordance with the S-RSSI of respective remaining resources after step 802 is moved to the set $S_{B,i}$ until the ratio of resources of $S_{B,i}$ is $R_i'$. The threshold $R_i'$ may be a fixed value, for example, 20%, or the threshold $R_i'$ may be determined for each carrier based on the amount of traffic to be transmitted currently and the load of each carrier, respectively. The threshold $R_i'$ may be the same as or different from the threshold value $R_i$ selected in conducting the resource selection based on the SA and the received power.

Finally, the UE selects the resource for data transmission on the M carriers based on the set $S_{B,i}$ of the M carriers (804). The resources may be selected independently from the set $S_{B,i}$ for the i-th carrier.

Alternatively, the UE may jointly select resources for data transmission on the M carriers in step 804. For example, factors such as the half-duplex problem shown in FIG. 6 may be taken into account in resource selection. When a resource is selected for the i-th carrier, it may preferentially select resources located in the same sub-frame for a plurality of carriers. Alternatively, when a resource is selected for the i-th carrier, it may preferentially select resources located in the same sub-frame for a plurality of carriers at a specific probability. For example, the UE generates a random number r evenly distributed between [0, 1]. If r is less than or equal to the threshold P, the UE preferentially selects resources located in the same sub-frame for a plurality of carriers; otherwise, it select resources independently for each carrier. The threshold P may be pre-defined, configured by higher layer signaling, or determined dynamically by the UE. For example, the UE determines the threshold P according to the congestion state and the traffic type of the M carriers. In particular, except for the M carriers, assuming that the resource selected and reserved by the UE on a portion of the carriers is still in use, the UE may preferentially select or preferentially select a resource that is located in the same sub-frame as that of other carriers of the resource in use at a specific probability. Alternatively, when selecting a resource, it may be such that the number of sub-frames occupied by the resource selected by the UE on the M carriers does not exceed a certain threshold in the selection window. Alternatively, when selecting a resource, it may be such that the number of sub-frames occupied by the resource selected by the UE does not exceed a certain threshold in the selection window on a plurality of carriers including the M carriers and the carriers on which the resource in use is located. Alternatively, when selecting a resource, it may be such that the number of sub-frames occupied by the resource selected by the UE on the N carriers does not exceed a certain threshold in the selection window. The selection window may refer to a selection window on each carrier, or may be a superset of selection windows of the M carriers. The threshold may be pre-defined, configured by higher level signaling, or determined dynamically by the UE. For example, the UE determines the threshold based on the congestion state and traffic type of the M carriers. In some special cases, the UE may fail to select resources that satisfy the threshold on the set $S_{B,i}$ of M carriers. In this case, the threshold may be adjusted to relax the restriction on resource selection. Or the UE may not be limited by the threshold. That is, the resource is selected from the set $S_{B,i}$ independently for each carrier.

In step 804, for the M carriers, the UE may successively select resources for each carrier in a specific order. The UE may prioritize the primary carrier to other carriers; or the UE may process the respective carriers in the order in which the carrier index increases; or the UE may preferentially process a carrier with a higher priority according to the priorities of traffic on the respective carriers, so as to ensure the transmission of traffic with a high priority. If the UE does not have resources that have been selected and reserved on any carrier, for a specific carrier, for example, the carrier with the smallest index, the carrier with the highest traffic priority, or the primary carrier (assuming that the index of the carrier is x), the UE may randomly select K resources from the set $S_{B,x}'$ and K is the number of times the data needs to be transmitted. For a carrier on which no resource is selected, assume that the index of the carrier is y. Corresponding to the sub-frame occupied by the resource selected on the carrier on which the resource has been selected, if there is available resources in the set $S_{B,y}'$ the UE preferentially selects such a resource for the carrier y; or the UE preferentially selects such a resource for the carrier y at a specific probability; or it may be such that the number of sub-frames occupied by the resource selected by the UE on the M carriers does not exceed a certain threshold in the selection window; or, it may be such that the number of sub-frames occupied by the resource selected by the UE does not exceed a certain threshold in the selection window on a plurality of carriers including the M carriers and the carriers on which the resource in use is located; or it may be such that the number of sub-frames occupied by the resource selected by the UE on the N carriers does not exceed a certain threshold in the selection window. The plurality of resources selected on one carrier is within the sub-frame range on which the same data are transmitted as indicated by the SA, and satisfy the traffic latency requirements.

Alternatively, the UE may first exclude resources of a portion of sub-frames based on the set $S_{B,i}$ of M carriers in selecting resources in step 804. For a sub-frame that is excluded, it satisfies $x_s \leq x$ if resources belonging to the set $S_{B,i}$ are present in $x_s$ carriers. The threshold x may be pre-defined, configured by higher level signaling, or determined dynamically by the UE. For example, the UE may determine the threshold based on the congestion state and the traffic type of the carriers. For example, x is equal to 1. When it is to exclude the resource of sub-frames, the UE may preferentially exclude the sub-frames with a smaller $x_s$. When there are multiple sub-frames with the same $x_s$ and only a portion of the multiple sub-frames is to be excluded, the UE may randomly exclude a portion of the sub-frames. In addition, the number or ratio of sub-frames and/or resources excluded by the UE does not exceed a certain threshold y. This avoids the reduction in the randomness of the resources finally selected by the UE due to the exclusion of too many sub-frame resources. The threshold y may be the maximum number of sub-frames that can be excluded; or the threshold y may be the maximum ratio of the number of sub-frames that can be excluded to the total number of sub-frames within the selection window; or the threshold y may be the maximum ratio of the number of sub-frames that can be excluded to the total number of sub-frames on which carries in the set $S_{B,i}$ are located; or the threshold y may be the maximum number of resources in sub-frames that can be excluded, or the threshold y may be the maximum ratio of the number of resources in the sub-frames that can be excluded to the total number of resources in the selection window; or the threshold y may be the maximum ratio of the number of resources in sub-frames that can be excluded to the total number of resources in the set $S_{B,i}$. The threshold y may be predefined, configured by higher level signaling, or dynamically determined by the UE. After excluding a portion of the sub-frames, resources are selected independently from the remaining resources of the set $S_{B,i}$ on the i-th carrier.

Here, the number of carriers that can be transmitted simultaneously by the UE within a sub-frame may be limited due to the limitation of the UE transmission capability or the maximum transmission power limit. Therefore, it is possible to introduce a parameter $x_{max}$ so that the number of carriers that can be transmitted simultaneously by the UE in one sub-frame is less than or equal to $x_{max}$. $x_{max}$ may be pre-defined, configured by higher level signaling, or dynamically determined by the UE. For example, the UE determines the threshold $x_{max}$ based on the congestion state and traffic type of the M carriers. For example, $x_{max}$ is less than or equal to the number of simultaneous transmitted carriers supported by the UE. For example, if the UE has selected resource(s) on the $x_{max}$ carriers within a sub-frame, when selecting resources for the i-th carrier from the remaining resources of the set $S_{B,i}'$ the UE excludes the resources located in the sub-frame from the remaining resources of the set $S_{B,i}'$ and then selects the resource.

In some special cases, if there is no enough candidate resources for one or more carriers in the remaining resources of the set $S_{B,i}$ of the M carriers, the UE may relax the restriction of the factors on the resource selection. For example, the UE may relax the restriction on the resource selection by reducing the number of sub-frames to be excluded, or the UE may select resource independently from the set $S_{B,i}$ for each carrier without having to satisfy the constraint of the factors.

In the method of performing a resource selection on M carriers shown in FIG. 8, before the resource selection is performed, the UE determines whether the resource of the M carriers that is currently selected shall be kept or shall be re-selected according to a specific probability p; alternatively, before the resource selection is performed, the UE determines whether the resource that is currently selected shall be kept or shall be re-selected according to a specific probability $p_i$ for the i-th carrier. The parameters p and $p_i$ may be pre-defined, configured by higher level signaling, or determined dynamically by the UE. For example, the UE determines p and $p_i$ according to the congestion state and traffic type of the M carriers. In the method of performing a resource selection on M carriers shown in FIG. 8, if it re-selects resources of a plurality of carriers, the UE may generate a count value C and the resources selected by the UE on each carrier are reserved for C cycles consecutively; alternatively, the UE may generate a count value $C_i$ for the i-th carrier, and the resources selected by the UE on the carrier are reserved for $C_i$ cycles consecutively. The parameters C and $C_i$ may be pre-defined, configured by higher level signaling, or determined dynamically by the UE. For example, the UE determines C and $C_i$ according to the congestion state and traffic type of the M carriers. According to the method, the same probability p and the parameter C are applied to the M carriers so that the resource selection of the M carriers is always completed at the same time, which is advantageous for avoiding or reducing the half-duplex problem of FIG. 6. For example, if carrier A and carrier B perform resource selection at different times, and UE selects the resource located in sub-frame a on carrier A and performs data transmission, the UE cannot detect resources located in sub-frame a on carrier B due to the half-duplex limitation. When it is necessary to perform resource selection at the carrier B, the sub-frame corresponding to the sub-frame a in the selection window of the carrier B is not available. This causes the resource selected on carrier B to be different from the resource selected on carrier A, which deteriorates the half-duplex problem.

After the UE selects the resource for data transmission on the M carriers based on the set of the M carriers in step 804, the data transmission on the selected resource for the M carriers may cause the UE to fail to detect sufficient resources, and thus cannot effectively perform the next resource selection. In this case, the UE may be triggered to perform step 804 again. For example, the UE may perform step 804 again when the UE cannot detect enough resources on at least one carrier. Or in general, the UE may perform step 804 again when the UE cannot detect enough resources on at least x carriers. x may be a predefined constant, a value configured by higher layer signaling, or a preconfigured value. x may have a value greater than or equal to 1. In some examples, a metric may be calculated in conjunction with resources that the UE cannot detect on the M carriers, and the UE performs step 804 again when the metric indicates that the UE cannot detect enough resources. In some special cases, for example, in the case that the data transmission of the UE at the selected resources of the M carriers may still cause the UE not able to detect enough resources even after one or more re-execution of step 804, the UE may directly keep the resources selected on the M carriers, or the UE may independently select resources from the set $S_{B,i}$ for each carrier. The resources that cannot be detected may be resources that cannot be detected by the UE for various reasons in the art, and will not be described here for simplicity. In some examples, for a carrier, the UE cannot detect enough resources may be the cases: when the number of sub-frames actually can be detected by the UE on a carrier is less than a certain threshold, or the ratio of the number of sub-frames actually can be detected by the UE on a carrier to the total number of sub-frames in the sensing window is less than a certain threshold, the UE may consider that it cannot detect enough resources on this carrier. Or in other examples, on a carrier, it is determined that some of the sub-frames within the UE's selection window are not available based on the sub-frames that are not detected by the UE within the sensing window. In this case, the UE cannot detect enough resources may be the cases: when the number of remaining available sub-frames in the UE's selection window (other than the unavailable sub-frame) is less than a certain threshold, or when the ratio of the number of remaining available sub-frames in the UE's selection window to the total number of sub-frames in the selection window is less than a certain threshold, the UE may consider that it cannot detect enough resources on this carrier.

Fourth Embodiment

For a UE supporting transmission of data over N carriers, the number $N_T$ of carriers supporting simultaneous transmission is generally less than or equal to the number $N_R$ of carriers supporting simultaneous reception. The number of carriers that the UE actually uses to transmit data can exceed $N_T$. The UE can only transmit data on up to $N_T$ carriers in a sub-frame at the same time, but the UE can transmit data on different carriers in different sub-frames. That is, after the UE completes transmission on a carrier within a sub-frame, it is possible to switch the transmission device to another carrier and transmit data on the carrier. It takes a switching time for the UE to switch carriers. During the period of the switching time, the UE cannot transmit data; further, the UE may not be able to receive data at some or all of the period of the switching time. The parameter $N_T$ may be a UE specific parameter, i.e., each TX chain of the UE can be used for each frequency supported by the UE; or, the parameter $N_T$ may be a parameter related to a band or a band combination. That is, a TX chain of the UE is only used for a portion of the band or the band combination supported by the UE. The carrier switching time may be a UE specific parameter, or a parameter related to a band or a band combination. For example, assuming that $N_T$ is a UE specific parameter and the UE transmits on the $N_T$ carrier in sub-frame n, the UE cannot transmit until subframe n+k on a carrier other than the $N_T$ carriers due to the carrier switching time. When the UE does not transmit within consecutive k sub-frames following the sub-frame n, the UE may transmit on the subframe n+k+1 on a carrier other than the $N_T$ carriers. The value of k depends on the carrier switching time of the UE, for example, k is equal to 1 or 0. Since the last symbol of a sub-frame is not used for transmission, when the carrier switching time is faster, for example less than 30 us, the length of one symbol is sufficient to switch between carriers, and k can be equal to 0 in such case. When the carrier switching time is relatively long, for example, up to several hundred us, the length of one symbol is not enough to complete the switch, and k can be equal to 1 in such case. In the resource selection, considering the parameter $N_T$ and the carrier switching time, it is necessary to ensure or to ensure that the selected resource satisfies the parameter $N_T$ and the carrier switching time as much as possible.

When the UE transmits data on multiple carriers, the total transmission power in one sub-frame cannot exceed the maximum transmission power of the UE. Accordingly, when the UE performs a resource selection, it shall ensure that the transmission power on a plurality of carriers on which data are transmitted simultaneously in one sub-frame does not exceed the maximum transmission power. Assuming that the transmission power of the UE is related to the pathloss (PL) of the UE to the base station, the transmission power P of the UE on one carrier varies with time since PL is variable. In the resource selection, the UE may calculate the transmission power for a certain period of time in the future based on the current PL as p=f(PL). The UE may also obtain a transmission power of the UE P=f(PL)+Δ by adding a specific offset value to the transmission power calculated from the current PL. For example, if Δ is greater than 0, the total transmission power may not exceed the maximum transmission power when the UE increases transmission power at subsequent transmissions.

Figure 9:
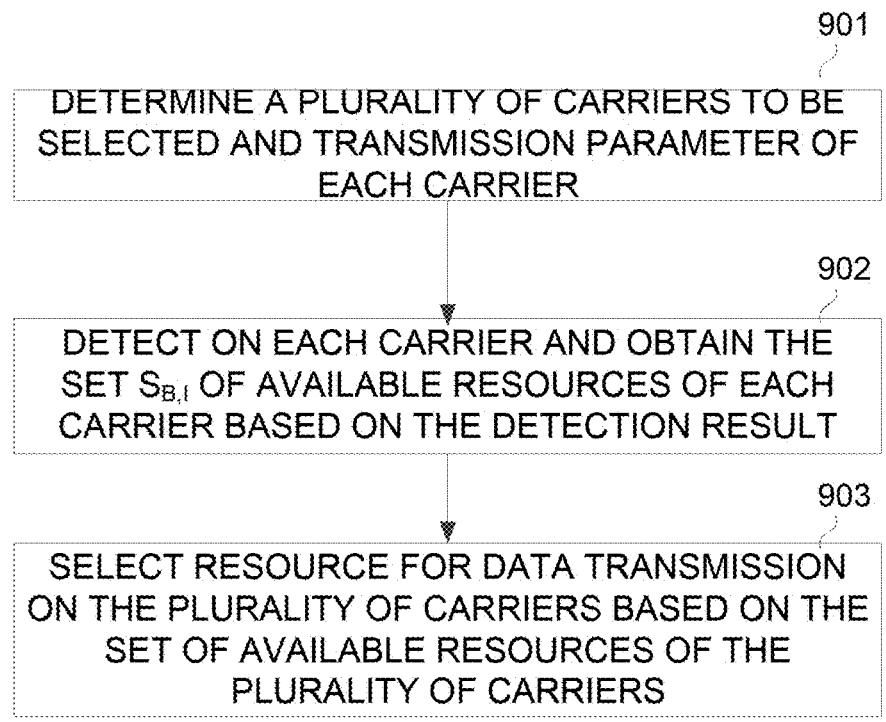
FIG. 9 is a flow chart of another method of resource selection on one or more carriers according to an embodiment of the present disclosure.

When the UE makes a resource selection on a plurality of carriers, as shown in FIG. 9, the UE first determines M carriers to be selected and the transmission parameters for each carrier (901), where M is greater than or equal to one. For example, if the method of the first embodiment is used, the M carriers and the transmission parameters of each carrier are obtained for a resource selection scheme. Alternatively, the UE may perform the resource selection only on a portion of the carriers, and the selected and reserved resources on the other portion of the carriers are still in use. In such a case, the M carriers belong to the portion of the carriers from which the resource is to be selected currently. The number of subchannels of the resource to be selected on the i-th carrier is $n_i$, the priority is $r_i$, i=0, 1, M−1, and M is the number of carriers on which the UE performs the resource selection.

The UE performs detection on the plurality of carriers, including receiving the SA and measuring the received power of the data channel scheduled by the correctly received SA, and measuring the received energy of each subchannel. Next, the UE may exclude the unavailable resources for each carrier according to the detection result (902). The set of remaining resources after exclusion of the unavailable resources is denoted by $S_{B,i}'$.

In step 902, the UE may exclude unavailable resources for each carrier independently according to, for example, steps 802 and 803 of the third embodiment. Alternatively, at step 902, the UE may also exclude the unavailable resources for each carrier by considering jointly the M carriers. For example, the UE may first exclude the unavailable resource based on factors such as the parameter $N_T$, the carrier switching time, the maximum transmission power and the like; the UE may then exclude the unavailable resource for each carrier according to the detection result according to, for example, steps 802 and 803 of the third embodiment.

For the M carriers, the UE may randomly determine the order in which the respective carriers are to be processed. Alternatively, the UE may successively select resources for each carrier in a specific order. The UE may prioritize the primary carrier to other carriers; or the UE may process the respective carriers in the order in which the carrier index increases; or the UE may preferentially process a carrier with a higher priority according to the priorities of traffic on the respective carriers, so as to ensure the transmission of traffic with a high priority.

Considering the parameter $N_T$ and the carrier switching time, it is assumed that for a carrier, there are x1 consecutive sub-frames and other $N_T$ carriers. The UE excludes the x1 consecutive sub-frames from the selection window of the carrier if the UE has selected a resource on at least one of the x1 consecutive sub-frames on each of the other $N_T$ carriers and there is no consecutive k idle sub-frames in the x1 consecutive sub-frames on the other $N_T$ carriers, where k is greater than or equal to 1. The above restriction is applicable to all carriers of the UE if the parameter $N_T$ and the carrier switching time are UE specific parameter. The above restriction is applicable to all carriers belong to one band or a band combination if the parameter $N_T$ and the carrier switching time are related to the band or the band combination. Alternatively, to be general, the above restriction is applicable to one set of carriers of the UE.

Alternatively, it is assumed that the UE selects a resource on at least one carrier of each of x consecutive sub-frames. It is also assumed that there are only y carriers, the UE selects a resource on at least one sub-frame of each carrier on the x consecutive sub-frames, y is less than or equal to $N_T$. If y is equal to $N_T$, for a carrier other than the y carriers, the UE excludes the x consecutive sub-frame from the selection window of the carrier. If there are at least k idle sub-frames after the x consecutive sub-frames and no resource in the idle sub-frames has been selected, the UE can select a resource on the carrier on a sub-frame which is after the k idle sub-frames on the carrier. The above restriction is applicable to all carriers of the UE if the parameter $N_T$ and the carrier switching time are UE specific parameter. The above restriction is applicable to all carriers belong to one band or a band combination if the parameter $N_T$ and the carrier switching time are related to the band or the band combination. Alternatively, to be general, the above restriction is applicable to one set of carriers of the UE.

Considering the parameter $N_T$ and the carrier switching time, it is assumed that the $N_T$ and the carrier switching time are UE specific parameters. For a carrier, if the UE selects a resource on at least other $N_T$ carriers of sub-frame n, the UE may exclude the sub-frame located in the range [n−k1, n+k2] in the selection window of the carrier. Alternatively, it is assumed that the parameter $N_T$ and the carrier switching time are related to a band or a band combination. For a carrier, it is assumed that the UE has selected resource in subframe n on at least other $N_T$ carriers related to the band or the band combination to which it belongs. The UE may exclude sub-frames within the range [n−k1, n+k2] in the selection window on the carrier. Alternatively, for a carrier out of a set of carriers, based on the number $N_T$ of simultaneous transmitted carriers in the set of carriers and the carrier switching time supported by the UE, if the UE selects resources on other $N_T$ carriers of the set of carriers in sub-frame n, the UE may exclude sub-frames within the range [n−k1, n+k2] in the selection window of the carrier. The values of k1 and k2 depend on the carrier switching time of the UE. For example, k1 and k2 are equal to 1 or 0. For example, since the last symbol of the sub-frame is not used for transmission, the length of one symbol is sufficient when the carrier switching time is faster, and k1 and/or k2 may be equal to zero. When k1 and k2 are equal to 0, the range [n−k1, n+k2] actually includes only sub-frame n.

Alternatively, assuming that the parameter $N_T$ and the carrier switching time are UE specific parameters, and that for a carrier there are consecutive k+1 sub-frames and at least other $N_T$ carriers such that the UE selects resources in at least one sub-frame of each of the at least other $N_T$ carriers, the UE may exclude the k+1 sub-frames within the selection window of the carrier. Alternatively, assuming that the parameter $N_T$ and the carrier switching time are related to a band or a band combination, and that for a carrier there are continuous k+1 sub-frames and at least other $N_T$ carriers in a band or a band combination such that the UE selects resources on at least one sub-frame of each of the at least other $N_T$ carriers, the UE may exclude the k+1 sub-frames within the selection window of the carrier. Alternatively, for a carrier out of a set of carriers, based on the number $N_T$ of simultaneously transmitted carriers and the carrier switching time supported by the UE on the set of carriers, it is assumed that there are consecutive k+1 sub-frames and at least other $N_T$ carriers of the set of carriers such that the UE selects resources on at least one sub-frame of each of the at least other $N_T$ carriers, the UE may exclude the k+1 sub-frames within the selection window of the carrier. When k is equal to 0, the consecutive k+1 sub-frames are actually one sub-frame.

Alternatively, consider a case where k is greater than or equal to 1, and the parameter $N_T$ and the carrier switching time are UE specific parameters. For consecutive q sub-frames and at least other $N_T$ carriers for a carrier, where q is a positive integer, if the UE selects resources on at least one sub-frame of each of the at least other $N_T$ carriers and selects resources on at least one carrier of each sub-frame that belongs to the at least other $N_T$ carriers, the UE may exclude the resources of the q sub-frames within the selection window of the carrier. Alternatively, consider the case that the parameter $N_T$ and the carrier switching time are related to a band or a band combination. In a band or a band combination, assuming that for a carrier there are consecutive q sub-frames and at least other $N_T$ carriers, if the UE selects resources on at least one sub-frame of each of the at least other $N_T$ carriers and selects resources on at least one carrier of each sub-frame that belongs to the at least other $N_T$ carriers, the UE may exclude the resources of the q sub-frames within the selection window of the carrier. Alternatively, for a carrier out of a set of carriers, based on the number $N_T$ of simultaneously transmitted carriers and the carrier switching time supported by the UE on the set of carriers, if there are consecutive q sub-frames and at least other $N_T$ carriers of the set of carriers and the UE selects resources on at least one sub-frame of each of the at least other $N_T$ carriers and selects resources on at least one carrier of each sub-frame that belongs to the at least other $N_T$ carriers, the UE may exclude the resources of the q sub-frames within the selection window of the carrier.

Regarding the maximum transmission power, the UE may exclude the sub-frame n in the selection window of the other carriers if the transmission power on the plurality of carriers on which data are transmitted on sub-frame n has reached or exceeded the maximum transmit power. For a carrier, if a transmission on a sub-frame results in a power exceeding the maximum transmission power, resources of the sub-frame in the selection window of the carrier is excluded.

The UE may consider the factors in a specific order. For example, the resource selected by the UE shall satisfy the effect of the parameter $N_T$ and the carrier switching time, which otherwise may cause the UE to discard the data on a portion of the carriers in one sub-frame. Secondly, the UE may preferentially take the maximum transmission power into account.

Finally, the UE selects the resources for data transmission on the M carriers based on the available resource sets $S_{B,i}$ of the M carriers (903).

In step 903, the UE may independently select resources from the set $S_{B,i}$ for each carrier. With this method, the independently selected resources on each carrier may not be able to satisfy the parameter $N_T$ and the carrier switching time, and/or the maximum transmission power, in which case the UE may be triggered to re-execute step 903.

For example, regarding the parameter $N_T$ and the carrier switching time, assuming that k is greater than or equal to 1 and there are x1 consecutive sub-frames and more than $N_T$ carriers, if the UE selects resources on at least one sub-frame of each carrier, and there is no consecutive k idle sub-frames in the x1 consecutive sub-frames, i.e., there is no enough carrier switching time to support transmissions over $N_T$ carriers, the UE may be triggered to re-execute step 903. The above restriction is applicable to all carriers of the UE if the parameter $N_T$ and the carrier switching time are UE specific parameter. The above restriction is applicable to all carriers belong to one band or a band combination if the parameter $N_T$ and the carrier switching time are related to the band or the band combination. Alternatively, to be general, the above restriction is applicable to one set of carriers of the UE.

Alternatively, regarding the parameter $N_T$ and the carrier switching time, it is assumed that the $N_T$ and the carrier switching time are UE specific parameters. If the UE selects a resource on at least other $N_T$ carriers of the sub-frame n, and the UE also selects sub-frames in the range [n−k1, n+k2] on other carriers, the UE may be triggered to re-execute step 903. Alternatively, it is assumed that the parameter $N_T$ and the carrier switching time are related to a band or a band combination. For a carrier, it is assumed that the UE has selected resource in subframe n on at least other $N_T$ carriers related to the band or the band combination to which it belongs, and the UE also selects sub-frames within the range [n−k1, n+k2] on the carrier, the UE may be triggered to re-execute step 903. Alternatively, for a set of carriers, based on the number $N_T$ of simultaneously transmitted carriers and the carrier switching time supported by the UE on the set of carriers, if the UE selects resources on at least $N_T$ carriers of the sub-frame n and the UE also selects sub-frames in the range [n−k1, n+k2] on other carriers, the UE may be triggered to re-execute step 903.

Alternatively, assuming that the parameter $N_T$ and the carrier switching time are UE specific parameters, and that there are consecutive k+1 sub-frames and more than $N_T$ carriers such that the UE selects resources in at least one sub-frame of each carrier, the UE may be triggered to re-execute step 903. Alternatively, assuming that the parameter $N_T$ and the carrier switching time are related to a band or a band combination, and that there are continuous k+1 sub-frames and more than $N_T$ carriers in a band or a band combination such that the UE selects resources in at least one sub-frame of each carrier, the UE may be triggered to re-execute step 903. Alternatively, for a set of carriers, based on the number $N_T$ of simultaneously transmitted carriers and the carrier switching time supported by the UE on the set of carriers, it is assumed that there are consecutive k+1 sub-frames and more than $N_T$ carriers such that the UE selects resources in at least one sub-frame of each carrier, the UE may be triggered to re-execute step 903.

Alternatively, consider a case where k is greater than or equal to 1, and the parameter $N_T$ and the carrier switching time are UE specific parameters. For consecutive q sub-frames and more than $N_T$ carriers, where q is a positive integer, if the UE selects resources in at least one sub-frame of each carrier and selects resources in at least one carrier of each sub-frame, the UE may be triggered to re-execute step 903. Alternatively, consider the case that the parameter $N_T$ and the carrier switching time are related to a band or a band combination. In a band or a band combination, for consecutive q sub-frames and more than $N_T$ carriers, if the UE selects resources in at least one sub-frame of each carrier and selects resources on at least one carrier of each sub-frame, the UE may be triggered to re-execute step 903. Alternatively, for a set of carriers, based on the number $N_T$ of simultaneously transmitted carriers and the carrier switching time supported by the UE on the set of carriers, if there are consecutive q sub-frames and more than $N_T$ carriers and the UE selects resources in at least one sub-frame of each carrier and selects resources on at least one carrier of each sub-frame, the UE may be triggered to re-execute step 903.

Regarding the maximum transmission power, if there is a sub-frame in which the transmission power on the plurality of carriers on which data are simultaneously transmitted exceeds the maximum transmission power, the UE may be triggered to re-execute step 903.

In some special cases, for example, the parameter $N_T$ and the carrier switching time and/or the maximum transmission power cannot be satisfied after one or more re-execution of step 903, and the UE can directly keep the resource currently selected on the M carriers. Alternatively the UE may select resource independently from the set $S_{B,i}$ for each carrier without having to satisfy the constraint of the factors.

Alternatively, in step 903, based on the set $S_{B,i}$ of M carriers, the UE may also jointly select resources for data transmission on the M carriers. For example, in step 903, the UE may select resources for data transmission on the M carriers by taking one or more of the factors such as the parameter $N_T$ and the carrier switching time, the maximum transmission power, and the half-duplex problem shown in FIG. 6 into account.

In the resource selection, considering the parameter $N_T$ and the carrier switching time, it is necessary to ensure or to ensure that the selected resource satisfies the parameter $N_T$ and the carrier switching time as much as possible.

Considering the parameter $N_T$ and the carrier switching time, it is assumed that for a carrier there are x1 consecutive sub-frames and other $N_T$ carriers. The UE cannot select the x1 consecutive sub-frames of the carrier if the UE has selected a resource one at least one of the x1 consecutive sub-frames on each of the other $N_T$ carriers and there is no consecutive k idle sub-frames in the x1 consecutive sub-frames on the other $N_T$ carriers, where k is greater than or equal to 1. The above restriction is applicable to all carriers of the UE if the parameter $N_T$ and the carrier switching time are UE specific parameter. The above restriction is applicable to all carriers belong to one band or a band combination if the parameter $N_T$ and the carrier switching time are related to the band or the band combination. Alternatively, to be general, the above restriction is applicable to one set of carriers of the UE.

Alternatively, consider the case that k is greater than or equal to one, and for x consecutive sub-frames, the UE selects a resource on at least one carrier of each sub-frame. In the x consecutive sub-frames, there exists only y carriers, if the UE selects a resource in at least one sub-frame of each carrier, it shall satisfy that y is less than or equal to $N_T$. When y is equal to $N_T$, for a carrier other than the y carriers, the UE cannot select the x consecutive sub-frame on that carrier.

Also, only in the case that there are at least k idle sub-frames following the x consecutive sub-frames and no resources are selected in the idle sub-frames, the UE may select a resource on sub-frames after the k idle sub-frames on the carrier. The above restriction is applicable to all carriers of the UE if the parameter $N_T$ and the carrier switching time are UE specific parameter. The above restriction is applicable to all carriers belong to one band or a band combination if the parameter $N_T$ and the carrier switching time are related to the band or the band combination. Alternatively, to be general, the above restriction is applicable to one set of carriers of the UE.

Alternatively, regarding the parameter $N_T$ and the carrier switching time, it is assumed that the $N_T$ and the carrier switching time are UE specific parameters. If for a carrier, the UE selects a resource on at least other $N_T$ carriers of sub-frame n, the UE cannot select sub-frames in the range [n−k1, n+k2] on the carrier. Alternatively, it is assumed that the parameter $N_T$ and the carrier switching time are related to a band or a band combination. For a carrier, if the UE has selected resource in subframe n on at least other $N_T$ carriers related to the band or the band combination to which it belongs, the UE cannot select sub-frames in the range [n−k1, n+k2] on the carrier. Alternatively, for a carrier out of a set of carriers, based on the number $N_T$ of simultaneously transmitted carriers and the carrier switching time supported by the UE on the set of carriers, if the UE selects resources on at least other $N_T$ carriers of the set of carriers of the sub-frame n, the UE cannot select sub-frames in the range [n−k1, n+k2] on the carrier.

Alternatively, assuming that the parameter $N_T$ and the carrier switching time are UE specific parameters, if for a carrier there are k+1 consecutive sub-frames and at least other $N_T$ carriers, the UE cannot select the k+1 consecutive sub-frames on the carrier if the UE selects resources on at least one sub-frame of each of the at least other $N_T$ carriers. Alternatively, assuming that the parameter $N_T$ and the carrier switching time are related to a band or a band combination, if for a carrier there are k+1 continuous sub-frames and at least other $N_T$ carriers in a band or a band combination, the UE cannot select the k+1 consecutive sub-frames on the carrier if the UE selects resources on at least one sub-frame of each of the at least other $N_T$ carriers. Alternatively, for a carrier out of a set of carriers, based on the number $N_T$ of simultaneously transmitted carriers and the carrier switching time supported by the UE on the set of carriers, if there are consecutive k+1 sub-frames and at least other $N_T$ carriers of the set of carriers, the UE cannot select the k+1 consecutive sub-frames on the carrier if the UE selects resources on at least one sub-frame of each of the at least other $N_T$ carriers.

Alternatively, consider a case where k is greater than or equal to 1, and the parameter $N_T$ and the carrier switching time are UE specific parameters. If for a carrier there are q consecutive sub-frames and at least other $N_T$ carriers, the UE cannot select the q consecutive sub-frames on the carrier if the UE selects resources on at least one sub-frame of each of the at least other $N_T$ carriers and selects resources on at least carrier of each sub-frame that belongs to the at least other $N_T$ carriers. Alternatively, consider the case that the parameter $N_T$ and the carrier switching time are related to a band or a band combination. In a band or a band combination, if for a carrier there are q consecutive sub-frames and at least other $N_T$ carriers, the UE cannot select the q consecutive sub-frames on the carrier if the UE selects resources on at least one sub-frame of each of the at least other $N_T$ carriers and selects resources on at least carrier of each sub-frame that belongs to the at least other $N_T$ carriers. Alternatively, for a carrier out of a set of carriers, based on the number $N_T$ of simultaneously transmitted carriers and the carrier switching time supported by the UE on the set of carriers, for consecutive q sub-frames and other $N_T$ carriers of the set of carriers, the UE cannot select the q consecutive sub-frames on the carrier if the UE selects resources on at least one sub-frame of each of the at least other $N_T$ carriers and selects resources on at least carrier of each sub-frame that belongs to the at least other $N_T$ carriers.

The maximum transmission power can be taken into account in resource selection. It shall ensure or ensure that the transmission power on multiple carriers on which data are transmitted simultaneously in one sub-frame does not exceed the maximum transmit power as much as possible. For a carrier, if a transmission on a sub-frame results in a power exceeding the maximum transmission power, the sub-frame of the carrier cannot be selected.

The half-duplex problem shown in FIG. 6 can be taken into account in resource selection. The UE may preferentially selects or preferentially selects a resource that is located in the same sub-frame at a specific probability; or it may be such that the number of sub-frames occupied by the resource selected by the UE on the M carriers does not exceed a certain threshold in the selection window; or it may be such that the number of sub-frames occupied by the resource selected by the UE does not exceed a certain threshold in the selection window on a plurality of carriers including the M carriers and the carriers on which the resource in use is located; or it may be such that the number of sub-frames occupied by the resource selected by the UE on the N carriers does not exceed a certain threshold in the selection window. For example, it mat deal with the half-duplex problem according to step 804 of the third embodiment.

Alternatively, the UE may first exclude resources of a portion of sub-frames based on the set $S_{B,i}$ of M carriers in dealing with the half-duplex problem shown in FIG. 6. For a sub-frame s that is excluded, it satisfies $x_s \leq x$ if resources belonging to the set $S_{B,i}$ are present in $x_s$ carriers. The threshold x may be pre-defined, configured by higher level signaling, or determined dynamically by the UE. For example, the UE may determine the threshold based on the congestion state and the traffic type of the carriers. For example, x is equal to 1. When it is to exclude the resource of sub-frames, the UE may preferentially exclude the sub-frames with a smaller $x_s$. When there are multiple sub-frames with the same $x_s$ and only a portion of the multiple sub-frames is to be excluded, the UE may randomly exclude a portion of the sub-frames. In addition, the number or ratio of sub-frames and/or resources excluded by the UE does exceed a certain threshold y. This avoids the reduction in the randomness of the resources finally selected by the UE due to the exclusion of too many sub-frame resources. The threshold y may be the maximum number of sub-frames that can be excluded; or the threshold y may be the maximum ratio of the number of sub-frames that can be excluded to the total number of sub-frames within the selection window; or the threshold y may be the maximum ratio of the number of sub-frames that can be excluded to the total number of sub-frames on which carries in the set $S_{B,i}$ are located; or the threshold y may be the maximum number of resources in sub-frames that can be excluded, or the threshold y may be the maximum ratio of the number of resources in sub-frames that can be excluded to the total number of resources in the selection window; or the threshold y may be the maximum ratio of the number of resources in sub-frames that can be excluded to the total number of resources in the set $S_{B,i}$. The threshold y may be pre-defined, configured by higher level signaling, or dynamically determined by the UE. After excluding a portion of the sub-frames, resources are selected independently from the remaining resources of the set $S_{B,i}$ on the i-th carrier. For example, it mat deal with the half-duplex problem according to step 804 of the third embodiment.

In resource selection, it is possible to introduce a parameter $x_{max}$ so that the number of carriers that can be transmitted simultaneously by the UE in one sub-frame is less than or equal to $x_{max}$. $x_{max}$ may be pre-defined, configured by higher level signaling, or dynamically determined by the UE. For example, the UE determines the threshold $x_{max}$ based on the congestion state and traffic type of the M carriers. For example, $x_{max}$ is less than or equal to the number of simultaneous transmitted carriers supported by the UE. For example, if the UE has selected a resource on the $x_{max}$ carriers within a sub-frame, when selecting resources for the i-th carrier from the remaining resources of the set $S_{B,i}'$ the UE excludes the resources located in the sub-frame from the remaining resources of the set $S_{B,i}'$ and then selects the resource.

In some special cases, based on the set $S_{B,i}$ of the M carriers, if there is no enough candidate resources for one or more carriers in the set $S_{B,i}$ of the M carriers by taking one or more of the factors such as the parameter $N_T$ and the carrier switching time, the maximum transmission power, and the half-duplex problem shown in FIG. 6 into account, the UE may relax the restriction of the factors on the resource selection. For example, the UE may relax the restriction on the resource selection by reducing the number of sub-frames to be excluded in dealing with the half-duplex problem, or the UE may select resource independently from the set $S_{B,i}$ for each carrier without having to satisfy the constraint of the factors.

The UE may consider the factors in a specific order. For example, the resource selected by the UE shall satisfy the effect of the parameter $N_T$ and the carrier switching time, which otherwise may cause the UE to discard the data on a portion of the carriers in one sub-frame. Second, the UE may preferentially take the maximum transmission power into account. The UE may only select resources on a plurality of carries in one sub-frame if the total power of the plurality of carriers is not limited. Otherwise, if the UE preferentially selects resources on a plurality of carriers in one sub-frame, which may cause the total power of the UE within a sub-frame to exceed the maximum transmission power.

For example, based on the set $S_{B,i}$ of M carriers, the UE may exclude unavailable resources of the $S_{B,i}$ of M carriers according to a specific carrier priority by taking the parameter $N_T$, the carrier conversion time, and/or the maximum transmission power into account. Then, the UE may further exclude resources of a part of sub-frames of the set $S_{B,i}$ when the half-duplex problem shown in FIG. 6 is taken into account. For a sub-frame s that is excluded, it is assumed that there are resources on $x_s$ carriers that belong to the set $S_{B,i}'$ and $x_s$ is lower or equal to a threshold x. Finally, the UE may select resources from remaining resources of the set $S_{B,i}$ independently for $i_{th}$ carrier.

Alternatively, based on the set $S_{B,i}$ of M carriers, the UE may exclude resources of a part of sub-frames of the set $S_{B,i}$ when the half-duplex problem shown in FIG. 6 is taken into account. For a sub-frame s that is excluded, it is assumed that there are resources on $x_s$ carriers that belong to the set $S_{B,i}'$ and $x_s$ is lower or equal to a threshold x. The UE then may select resources from remaining resources of the set $S_{B,i}$ independently for $i_{th}$ carrier. If the independently selected resources do not satisfy the parameter $N_T$ and the carrier conversion time and/or the maximum transmission power, the UE repeats the selection of resources from remaining resources of the set $S_{B,i}$ independently for $i_{th}$ carrier. Alternatively, the UE may repeat the selection starting from the operation of excluding resources of a part of sub-frames of the set $S_{B,i}$ where the amount of resources of a part of sub-frames of the set $S_{B,i}$ that are excluded shall be changed.

In particular, in addition to the M carriers, assuming that the resource selected and reserved by the UE on a portion of the carriers is still in use, the UE needs to consider other carriers that have resources in use when dealing with the factors. For the M carriers, the UE may successively select resources for each carrier in a specific order. The UE may prioritize the primary carrier to other carriers; or the UE may process the respective carriers in the other in which the carrier index increases; or the UE may preferentially process a carrier with a higher priority according to the priorities of traffic on the respective carriers, so as to ensure the transmission of traffic with a high priority. If the UE does not have resources that have been selected and reserved on any carrier, for a specific carrier, for example, the carrier with the smallest index, the carrier with the highest traffic priority, or the primary carrier (assuming that the index of the carrier is x), the UE may randomly selects K resources from the set $S_{B,x}'$ and K is the number of times the data needs to be transmitted. For a carrier on which no resource is selected, assume that the index of the carrier is y. Corresponding to the sub-frame occupied by the resource selected on the carrier on which the resource has been selected, the UE may select resources on carrier y by taking one or more of the factors such as the parameter $N_T$ and the carrier switching time, the maximum transmission power, and the half-duplex problem shown in FIG. 6 into account.

Preferably, in step 902, the UE may not take the factors such as the parameter $N_T$ and the carrier switching time, the maximum transmission power, and the half-duplex problem shown in FIG. 6 into account; and in step 903, the UE may select resources for data transmission on the M carriers by taking one or more of the factors such as the parameter $N_T$ and the carrier switching time, the maximum transmission power, and the half-duplex problem shown in FIG. 6 into account.

Preferably, in step 902, the UE may take the factors such as the parameter $N_T$ and the carrier switching time, and the maximum transmission power into account; and in step 903, the resource is independently selected for each carrier, or by taking the half-duplex problem shown in FIG. 6 into account, for example, according to step 804 of the third embodiment.

After step 903, the data transmission on the selected resource for the M carriers may cause the UE to fail to detect sufficient resources, and thus cannot effectively perform the next resource selection. In this case, the UE may be triggered to perform step 903 again. For example, the UE may perform step 903 again when the UE cannot detect enough resources on at least one carrier. Or in general, the UE may perform step 903 again when the UE cannot detect enough resources on at least x carriers. x may be a predefined constant, a value configured by higher layer signaling, or a preconfigured value. x may have a value greater than or equal to 1. In some examples, a metric may be calculated in conjunction with resources that the UE cannot detect on the M carriers, and the UE performs step 903 again when the metric indicates that the UE cannot detect enough resources. The present disclosure does not limit the specific calculation of the metric. In some special cases, for example, in the case that the data transmission of the UE at the selected resources of the M carriers may still cause the UE not able to detect enough resources even after one or more re-execution of step 903, the UE may directly keep the resources selected on the M carriers, or the UE may independently select resources from the set $S_{B,i}$ for each carrier. The resources that cannot be detected may be resources that cannot be detected by the UE for various reasons in the art, and will not be described here for simplicity. In some examples, for a carrier, the UE cannot detect enough resources may be the cases: according to the resources selected on the M carriers by the UE, when the number of sub-frames actually can be detected by the UE on a carrier is less than a certain threshold, or the ratio of the number of sub-frames actually can be detected by the UE on a carrier to the total number of sub-frames in the sensing window is less than a certain threshold, the UE may consider that it cannot detect enough resources on this carrier. Or in other examples, according to the resources selected on the M carriers by the UE, on a carrier, it is determined that some of the sub-frames within the UE's selection window are not available based on the sub-frames that are not detected by the UE within the sensing window. In this case, the UE cannot detect enough resources may be the cases: when the number of remaining available sub-frames in the UE's selection window (other than the unavailable sub-frame) is less than a certain threshold, or when the ratio of the number of remaining available sub-frames in the UE's selection window to the total number of sub-frames in the selection window is less than a certain threshold, the UE may consider that it cannot detect enough resources on this carrier.

In the method of performing a resource selection on M carriers shown in FIG. 9, before the resource selection is performed, the UE determines whether the resource of the M carriers that is currently selected shall be kept or shall be re-selected according to a specific probability p; alternatively, before the resource selection is performed, the UE determines whether the resource that is currently selected shall be kept or shall be re-selected according to a specific probability $p_i$ for the i-th carrier. The parameters p and $p_i$ may be pre-defined, configured by higher level signaling, or determined dynamically by the UE. For example, the UE determines p and $p_i$ according to the congestion state and traffic type of the M carriers. In the method of performing a resource selection on M carriers shown in FIG. 9, if it re-selects resources of a plurality of carriers, the UE may generate a count value C and the resources selected by the UE on each carrier are reserved for C cycles consecutively; alternatively, the UE may generate a count value $C_i$ for the i-th carrier, and the resources selected by the UE on the carrier are reserved for $C_i$ cycles consecutively. The parameters C and $C_i$ may be pre-defined, configured by higher level signaling, or determined dynamically by the UE. For example, the UE determines C and $C_i$ according to the congestion state and traffic type of the M carriers. According to the method, the same probability p and the parameter C are applied to the M carriers so that the resource selection of the M carriers is always completed at the same time, which is advantageous for avoiding or reducing the half-duplex problem of FIG. 6.

Figure 10:
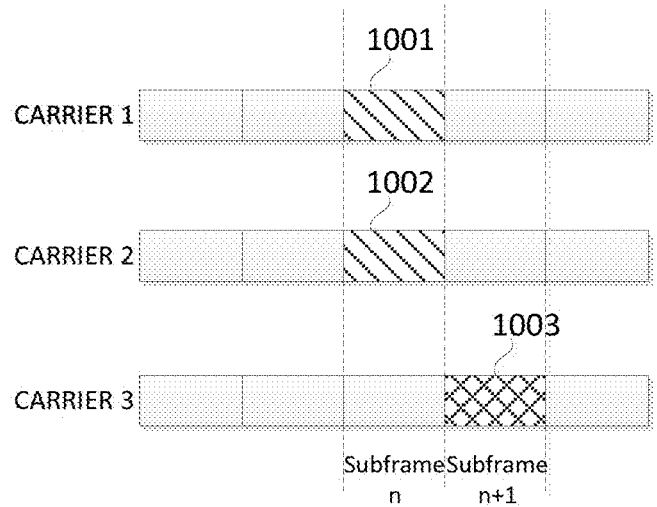
FIG. 10 is a schematic diagram showing the effect of a carrier switching time on data transmission.

Preferably, it is assumed that neither the parameter $N_T$ nor the carrier switching time is considered in steps 902 and 903. For example, it performs resource selection independently on the K carriers, which may lead to a case that the resources selected on the M carriers cannot satisfy the parameter $N_T$ and the carrier switching time. When such case occurs, the UE has to discard data on one or more carriers. In the case, the UE may preferentially transmit data within the sub-frame that is precedent in time. Alternatively, in the case, the UE may preferentially transmit data within sub-frames with the higher priority, depending on the priorities of data of the respective sub-frames of the respective carriers. If the data transmission in a plurality of sub-frames affects each other and the data of the plurality of sub-frames have the same highest priority, the UE may randomly select one of the plurality of sub-frames and transmit data in the selected sub-frame; or the UE may transmit data in a sub-frame which has a larger number or a larger amount of data; or the UE may select such a sub-frame of the plurality of sub-frames that the number or amount of data to be discarded due to the transmission of the sub-frame is smallest; or, the UE determines a sub-frame on which data is to be transmitted by taking the number or amount of data in the sub-frame and the number or amount of data to be discarded due to the transmission of the sub-frame both into account. For example, as shown in FIG. 10, it is assumed that k2 is greater than or equal to 1, and the UE can only support simultaneous data transmission on two carriers. On sub-frame n, the UE allocates resource 1001 on carrier 1 and resource 1002 on carrier 2. On the sub-frame n+1, the UE allocates resource 1003 on the carrier 3. The UE cannot transmit either data of the sub-frame n or data of the sub-frame n+1 due to the effect of the carrier switching time. Assuming that the data on resource 1003 has a higher priority than that on the resources 1001 and 1002, the UE may discard the data on resources 1001 and 1002, and transmit only the data on resource 1003.

Fifth Embodiment

It is assumed that the total number of Sidelink Process that the UE can use on a carrier is $N_{SL}$, where $N_{SL}$ is greater than or equal to 1; for example, $N_{SL}$ is equal to 2. The Sidelink Process means that the UE periodically reserves resources at a certain reservation interval and can perform transmission K times over a period of time, where K is greater than or equal to 1, for example, K is equal to 2. When the traffic of the UE is relatively large, it may exceed the carrying capacity of a Sidelink Process on one carrier. In this case, a first method may include enabling by the UE more than one Sidelink Process on one or more carriers, thereby increasing the amount of traffic being transmitted. When a carrier has occupied $N_{SL}$ Sidelink Processes, the UE can increase the number of the carriers to transmit more data. Alternatively, a second method may include that the UE increases the number of the carriers to transmit data and transmit data over a plurality of carriers. When the number of the carriers cannot be increased; for example, it is limited by the number of carriers supported by the UE, or a certain type of traffic can only be transmitted on a particular set of carriers, the UE may, by adding a Sidelink Process occupied by a carrier to transmit more data. It may be predefined, configured by higher level signaling or preconfigured, or even dynamically determined by the UE regarding the UE using either of the two methods. For example, the UE determines the method to be used based on information such as congestion state and traffic type of each carrier. Alternatively, a priority strategy may be defined regarding usage of the two methods. For example, the UE preferentially selects the second method as long as the UE has a multi-carrier transmission capability and the multiple carriers have sufficiently good detection results; otherwise, the UE selects the first method. The method is beneficial to reduce the load of a resource pool for a single carrier. Depending on the type of traffic, some traffic may be limited to a portion of the carriers. Each of the portion of the carriers can transmit data by using up to $N_{SL}$ Sidelink Processes. The UE may prioritize the transmission of data on one or more Sidelink Processes on carriers whose CBR is less than a threshold; otherwise, the UE may transmit data on other carriers. The threshold may be predefined, configured by higher level signaling, or preconfigured. The UE may prioritize the transmission of data on a carrier with the smallest CBR among carriers that occupy a number of Sidelink Processes with the number less than $N_{SL}$. Alternatively, the UE may transmit data on the carrier with the smallest CBR, while ensuring that the number of Sidelink Processes on the respective carriers is less than $N_{SL}$ and the difference between numbers does not exceed one.

The size of data D of the traffic may exceed the carrying capacity of a carrier. For example, for a 20 MHz bandwidth, the maximum transport block size (TBS) that can be transmitted on a sub-frame is 31704 bits. In the case, the data D needs to be divided into a plurality of smaller blocks so as to be mapped onto X carriers. The resource selection of the UE on the X carriers may include equalizing the number of times data is transmitted on each carrier. According to the method, the data transmission performances on the X carriers are close to each other, and the reliability of the data D is improved. For example, when a small block transmitted on a carrier is transmitted 2 times (initial and retransmission), the other blocks need to be transmitted twice on a corresponding carrier, so that the performance of the individual blocks is similar. In conducting the resource selection, on a carrier, the UE may first select a first resource, and then select a second resource in a sub-frame range by taking the first resource as the center (except for the sub-frame where the first resource is located). The sub-frame range is determined by the maximum interval of the two resources that transmit the same data as indicated by the SA and the traffic latency requirement. According to such a resource selection method, if there is no second available resource within the sub-frame range, only one resource is selected for this carrier. At this point, the UE may discard the first resource, that is, re-select a resource for the carrier to obtain two available resources. It is assumed that the set $S_B$ is obtained after the exclusion of the unavailable resources according to the detection result. The UE may select only one resource for a carrier if there is no two resources whose interval is less than the maximum interval and satisfy the traffic latency requirement in the set $S_B$; It is also possible for the UE to re-execute the resource selection and increase the number of resources in the set $S_B$ until there are such two resources whose interval is less than the maximum interval and satisfy the traffic latency requirements in the $S_B$.

It is assumed that the UE transmits data over multiple carriers. The congestion levels of different carriers are generally different. The UE may only adjust the transmission parameters on a carrier when the congestion level on the carrier changes, including discarding the packets. In the case that the UE transmits data D over X carriers, the UE may adjust only the transmission parameters on the resources of a portion of carriers or discard the data transmission over the resources on the portion of the carriers when the congestion level of the portion of the carriers in the X carriers changes, in order to avoid frequent resource selection on other carriers. This is advantageous in improving the efficiency of the resource selection algorithm for the other carriers, since one of the basic assumptions of the resource selection algorithm is that the UE periodically occupies the same resource. Alternatively, the UE may simultaneously adjust the transmission parameters of the resources of the X carriers or discard the data transmission over the resources of the X carriers at the same time, i.e., the respective small blocks of the data D which are transmitted on one resource on each carrier of the X carriers, or discard the data D totally.

In the case of transmitting data on X carriers, where X is greater than or equal to one, the packet size of a traffic is generally not constant. The X carriers may transmit data of the same traffic, or may transmit data of a plurality of traffics. One possible situation is that the UE has selected and reserved resources, but the resources previously reserved on the X carriers are not sufficient to transmit a packet with an increased size. At this time, the UE can perform resource reselection. The UE may discard the resource reservation of the X carriers and perform a resource selection on one or more carriers, for example, to re-execute the resource selection on the X carriers, thereby increasing the data carrying capacity of the carriers. The method helps to avoid or mitigate the half-duplex problem in FIG. 6 because the resource selection of the X carriers is always done at the same time. For example, assuming that the UE performs resource selection on carrier A and carrier B at different times, the UE selects the resource located in sub-frame a on carrier A and performs data transmission. The UE is not able to detect resource in sub-frame a on carrier B due to the half-duplex operation. When it is necessary to perform resource selection on carrier B, a sub-frame corresponding to sub-frame a in the selection window of carrier B is not available. This results that the resource selected on carrier B is located in different sub-frames from the sub-frames in which the resource selected on carrier A is located, which deteriorates the half-duplex problem. Alternatively, the UE may discard the resource reservation of one of the X carriers or of a portion of the X carriers and perform resource selection on one or more carriers, for example, only on one of the X carriers or a portion of the X carriers for which the resource reservation is discarded, thereby increasing the date carrying capacity of the carriers. For example, the carriers on which resource selection is performed may be carriers with a relatively low congestion level, i.e., the carriers with a relatively small CBR. The UE gives up the resource reservation of the X carriers in case that the packet with an increased size cannot be transmitted even if the UE gives up the resource reservation of one of the X carriers or of a portion of the X carriers and perform resource selection. Alternatively, the UE may enable more sidelink processes on one of the carriers or a portion of the carriers in the X carriers by performing resource selection to obtain the resources of the more sidelink processes, thereby increasing the data carrying capacity. Alternatively, the UE may perform resource selection on other carriers than the X carriers to obtain additional resources, thereby improving the data carrying capacity. By using this method, it is advantageous to improve the efficiency of the resource selection algorithm by avoiding the frequent resource selection of the carriers on which resource selection is not performed in the X carriers, because one of the basic assumptions of the resource selection algorithm is that the UE periodically occupies the same resource.

For a case where data is transmitted on X carriers, where X is greater than or equal to 1, the resources selected on the X carriers may be located in the same or different sub-frames. The X carriers may transmit data of the same traffic, or may transmit data of a plurality of traffics. One possible situation is that the reserved resources are not released after a number of packets have been transmitted, meanwhile the resources reserved on one or a portion of the carrier cannot meet the transmission requirements of the packet, for example, the latency requirement, reliability requirements or other performance requirements, and resources reserved on other carriers still meet the packet transmission requirements. At this time, the UE may discard the resource reservation of the X carriers and perform resource selection on one or more carriers, for example, on the X carriers to meet the transmission requirements. Similarly, the method helps to avoid or mitigate the half-duplex problem in FIG. 6 because the resource selection of the X carriers is always done at the same time. Alternatively, the UE may discard the resource reservation of one of the X carriers or a portion of the X carriers and perform resource selection on one or more carriers, for example, only on one of the X carriers or a portion of the X carriers for which the resource reservation is discarded, so as to meet the transmission requirements. The UE discards the resource reservation of the X carriers only if the resources of the X carriers do not satisfy the transmission request. By using this method, it is advantageous to improve the efficiency of the resource selection algorithm by avoiding the frequent resource selection of the carriers on which resource selection is not performed in the X carriers, because one of the basic assumptions of the resource selection algorithm is that the UE periodically occupies the same resource.

Assuming that the UE transmits data over multiple carriers, the resources reserved on carrier A are insufficient to transmit the data of carrier A (e.g., because of the change in congestion level of carrier A, the UE needs to adjust the transmission parameters or discard packets on carrier A), and that the UE has reserved resources on another carrier, carrier B. The traffic priority of carrier A and carrier B can be compared. When the traffic priority of carrier A is higher than that of carrier B and the reserved resources of carrier B can carry the data of the carrier A, the data of the carrier A can be transmitted on the reserved resource of the carrier B. The UE may discard the data of the carrier B; or, if the reserved resource of the carrier A can carry the data of the carrier B, the data of the carrier B may be transmitted on the reserved resource of the carrier A; or, the data of carrier B is transmitted on resources in Exception pool.

It is assumed that the UE may select resources and transmit data based on detection on multiple carriers. In some cases, the UE may not have such a good detection result on one carrier (e.g., in reselection or switching cases, etc.) that it can effectively performs resource selection on the carrier. For example, when the number of sub-frames actually detected by the UE on a carrier is less than a certain threshold, or when the ratio of the total number of sub-frames actually detected by the UE on one carrier to the total number of sub-frames in the sensing window is less than a certain threshold, the UE believes that the detection result on the carrier is not good enough. Alternatively, on a carrier, some sub-frames within the selection window of the UE are not available depending on the sub-frame that are not detected by the UE within the sensing window, and when the number of remaining available sub-frames is less than a certain threshold, or when the ratio of the number of remaining available sub-frames to the total number of sub-frames in the selection window is less than a certain threshold, the UE believes that the detection result on the carrier is not good enough. In particular, consider a case where the UE transmits data in different sub-frames on a plurality of carriers. If the UE transmits data on one carrier in a sub-frame, the UE may not be able to perform detection on another carrier due to half-duplex limitation, which reducing the number of sub-frames actually detected by the UE. In the case where the detection result is reduced due to the half-duplex limitation among the plurality of carriers, the resource may be selected on the carrier based on the available detection result; or, in such a case, the UE may believe that the detection result on the carrier is not good enough to select resources on the carrier; or, in such a case, when the number of sub-frames that cannot be detected due to the half-duplex limitation among the plurality of carriers or the ratio exceeds the specific threshold, the UE considers that the detection result on the carrier is not good enough, otherwise the UE still selects resources on the carrier based on the available detection results.

When the UE may not have an enough good detection result on carrier A, a first method is to map the data D of carrier A to an Exception pool for transmission. A second method is that, the UE select resources on another carrier, carrier B to transmit the data D if the UE has an enough good detection result on carrier B, and no data is transmitted on carrier B; or, the UE may select resources of a second Sidelink process on carrier B to transmit the data D if only a sidelink process is used to transmit data on carrier B. A third method is to compare the traffic priority of carrier A and carrier B if the UE has reserved resources on carrier B; and when the traffic priority of carrier A is higher than that of carrier B and the reserved resources of carrier B can carry the data of the carrier A, the data of the carrier A can be transmitted on the reserved resource of the carrier B. The UE may discard the data of the carrier B; or, the data of carrier B is transmitted on resources in Exception pool.

Sixth Embodiment

Figure 11:
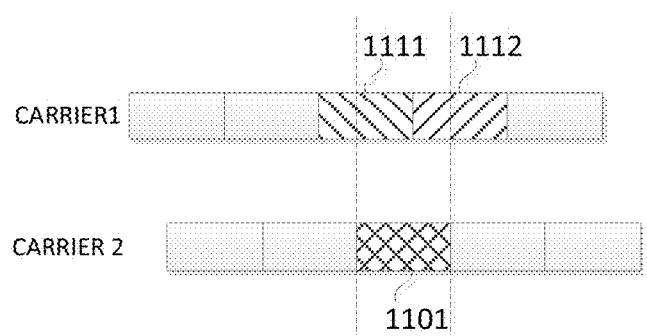
FIG. 11 is a schematic diagram showing a multi-carrier half-duplex operation when the timing offset is relatively large according to an embodiment of the present disclosure.

The synchronization sources of the UEs on multiple carriers may be different, which may result in different transmission timings on different carriers. As shown in FIG. 11, assuming that the UE transmits data on two carriers and the timing offset between the two carriers is high, when the UE transmits data in the sub-frame 1101 of carrier 2, the UE cannot perform the detection on sub-frames 1111 and 1112 of carrier 1. That is, the half-duplex problem of UE is more serious in the multi-carrier case. In addition, when the timing offset between the two carriers is relatively high, the data transmission in sub-frame n on one carrier may overlap with the data transmission in sub-frame n+1 or n−1 on the other carrier, resulting in an increase in the complexity of power allocation.

It is assumed that the UE supports transmission of data over multiple carriers, which may limit the UE to transmit data on a plurality of carriers only if the timing offset is within a certain range. This can mitigate or completely avoid the multi-carrier half-duplex problem and power control problem. Here, it is possible to limit the timing offset to T us. For example, similarly as in the LTE CA system, T can be approximately equal to T0, T0 is equal to 32.47; or the last OFDM symbol is punctured in sub-frames of the sidelink transmission, so that T can be equal to the length of an OFDM symbol, approximately equal to 71 us, such a timing offset would not result in a coincidence of data transmission in adjacent sub-frames on multiple carriers; alternatively, T may be equal to the length of an OFDM symbol minus the tx–rx switching time; if the switching time is 20 us, T is approximately equal to 51 us, such a timing offset would not result in a coincidence of data transmission in adjacent sub-frames on multiple carriers and can provide the tx–rx switching time; alternatively, T can be equal to the length of an OFDM symbol plus T0; that is, T is approximately equal to 101 us, which allows the data transmission in adjacent sub-frames on multiple carriers to overlap by no more than T0 us.

Alternatively, the timing offset of the UE on a plurality of carriers may not be limited, and the data transmission of the UE over a plurality of carriers is always allowed. In fact, in LTE CA systems, it is necessary to limit the timing offset among carriers due to the need of defining the timing of cross-carrier scheduling and the timing of HARQ-ACK feedback. However, in sidelink systems, there is no problem regarding scheduling and HARQ-ACK feedback, so it is possible not to limit the timing offset of carriers. However, it is necessary to control the multi-carrier half-duplex problem.

Seventh Embodiment

In LTE V2X systems, the total transmission power A of the UE (including PSCCH and PSSCH) is $A=\min\{P_{CMAX}, 10\log_{10}(M_{PSSCH}+10^{3/10}\times M_{PSCCH})+P_{O\_PSSCH,4}+\alpha_{PSSCH,4}\cdot PL\}$. $P_{O\_PSSCH,4}$ and $\alpha_{PSSCH,4}$ are power control parameters configured by higher level, $10\log_{10}(M_{PSSCH}+10^{3/10}\times M_{PSCCH})$ is a parameter that adjusts the transmission power according to the number of PRB occupied by the UE, and is the pathloss between the UE and the base station. The power control method is independent of MCS used by the UE for transmission data. Therefore, when the UE uses a relatively low MCS (e.g., QPSK), the coverage of the data transmission of the UE is relatively large; when the UE uses a relatively high MCS (e.g., 16QAM or 64QAM), the coverage of the data transmission of the UE is relatively small.

When the size of data D of the traffic is relatively large that may exceed the carrying capacity on one carrier. For example, for a 20 MHz bandwidth, the maximum transport block size (TBS) that can be transmitted on a sub-frame is 31704 bits. In the case, the data D needs to be divided into a plurality of smaller blocks so as to be mapped onto X carriers. Since the X carriers actually transmit the same data D, the small blocks shall have the same or similar transmission performance. According to the power control method of the LTE V2X, the transmission power of the UE is independent of the MCS. When the MCSs used by the UE are different in the X carriers, the coverage of the respective carriers may be different. Since the receiving party needs to receive all of the small blocks on the X carriers so that the data D can be obtained, the coverage of the UE is actually determined by the carrier having a relatively small coverage in the X carriers. The carrier with a large coverage in the X carriers actually wastes the transmission power and increases the interference level of the carrier. A method of addressing the problem of the UE on the different coverage of a plurality of carriers is described below.

A first method is to introduce an item f(MCS) related to MCS of the UE in the power control formula. That is, $A=\min\{P_{CMAX}, 10\log_{10}(M_{PSSCH}+10^{3/10}\times M_{PSCCH})+P_{O\_PSSCH,4}+\alpha_{PSSCH,4}\cdot PL+f(MCS)\}$. For example, f(MCS) may have a form that is consistent with the MCS related parameter $\Delta_{TF,c}(i)$ in the PUSCH control method of LTE.

A second method is to introduce an item $\Delta_{if}$ related to the interference level detected by the UE in the power control formula. That is, $A=\min\{P_{CMAX}, 10\log_{10}(M_{PSSCH}+10^{3/10}\times M_{PSCCH})+P_{O\_PSSCH,4}+\alpha_{PSSCH,4}\cdot PL+\Delta_{if}\}$. The interference level may be determined based on factors such as the congestion state of the carrier, the PSSCH-RSRP of the data channel scheduled by the received SA, and/or the S-RSSI measured on the subchannel. Generally speaking, when the interference level is relatively low, UE can transmit at a lower power, i.e., $\Delta_{if}$ being relatively small; when the interference level is relatively high, the UE needs to transmit at a higher power to ensure coverage, i.e., $\Delta_{if}$ being relatively large. $P_{O\_PSSCH,4}$ is used to compensate the long-term link state of the UE, and $\Delta_{tf}$ is used to compensate the dynamic change of the link.

A third method is to introduce an item f(MCS,interferencelevel) related to MCS of the UE and the interference level detected by the UE in the power control formula. That is, A=min $\{P_{CMAX}, 10 \log_{10}(M_{PSSCH}+10^{3/10} \times M_{PSCCH}) + P_{O\_PSSCH,4} + \alpha_{PSSCH,4} \cdot PL + f(MCS, interferencelevel)\}$. In this way, the UE can determine its transmission power according to the MCS and the detected interference level both.

With the three methods of modifying the power control formula, the UE can reasonably set the transmission power on each carrier, thus optimizing the transmission performance of the UE on each carrier.

When the UE is power limited, the UE needs to adjust the transmission power of each carrier so that the total transmission power of the UE does not exceed the maximum transmission power. Here, the transmission power of the carriers before the adjustment may be determined according to the three methods; alternatively, it is also possible to use an existing method to determine the transmission power, for example, by A=min $\{P_{CMAX}, 10 \log_{10}(M_{PSSCH}+10^{3/10} \times M_{PSCCH}) + P_{O\_PSSCH,4} + \alpha_{PSSCH,4} \cdot PL\}$.

A first method of dealing with UE power limitation may include weighting the transmission powers on respective carriers with equal weighting coefficients so that the total transmission power of the respective carriers does not exceed the maximum transmission power. In a second method of dealing with UE power limitation, the UE may preferentially guarantee the power for data transmission on a carrier with a higher traffic priority and allocate the remaining power to a carrier with a lower traffic priority. For example, the power for data transmission is allocated for the carriers in descending order of the traffic priorities of the carriers. When there are multiple carriers having the same priority, the transmission power of the multiple carriers can be weighted with equal weighting coefficients so that the total transmission power of the respective carriers does not exceed the maximum transmission power. In a third method of dealing with UE power limitation, the UE may determine the weighting coefficients according to the traffic priorities of the respective carriers. Generally speaking, the weighting coefficient of the traffic with a high priority is relative high. The proportions of weighting coefficients of the respective carriers may be constant, and the total transmission power of the respective carriers does not exceed the maximum transmission power by adjusting the values of the weighting coefficients.

For a UE that transmits data over multiple carriers, when the UE is power limited, the effect of coverage of each carrier of the UE may be taken into account when adjusting the transmission power of each carrier of the UE. For example, the transmission powers of the respective carriers can be reduced in descending order of the coverage of the respective carriers. The UE may first reduce the transmission power of the carrier with a relatively large coverage, such as the data transmission of the carrier with a low MCS and/or a low interference level. When the coverage of each of multiple carriers is close to each other, the UE further adjusts the transmission power of each of the carriers if the power is still limited. For example, the three methods of dealing with UE power limitation may be used to deal with the transmission power.

According to the method, the present application also discloses a UE which can be used to implement the method.

Figure 12:
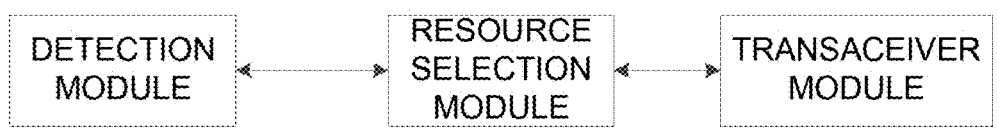
FIG. 12 is a schematic block diagram of a user equipment for performing resource selection on a plurality of carriers according to an embodiment of the present disclosure

As shown in FIG. 12, the UE comprises a detection module, a resource selection module and a transceiver module, wherein:

the detection module is configured to detect a scheduling assignment signal SA of another UE in a sensing window of each of a plurality of carriers, measure a received power of a scheduled data channel based on the SA, and detect a received energy of each subchannel of each sub-frame in the sensing window;

the resource selection module is configured to select a resource for data transmission on the plurality of carriers based on the SA, the received power, and the received energy;

the transceiver module is configured to perform data transmission by using the selected resource.

It will be understood by those of skilled in the art that all or a portion of the steps of the method of the embodiments described above may be implemented by an associated hardware with a program stored in a computer readable storage medium, When executed, the program causes the hardware to implement steps including one of the steps of the method embodiment or a combination thereof.

In addition, the functional units in the various embodiments of the present application may be integrated in a processing module, or each unit may be a physically unit, or two or more units may be integrated in one module. The integrated module can be implemented in the form of hardware, or in the form of software function modules. The integrated module may also be stored in a computer-readable storage medium if it is implemented in the form of a software function module and is sold or used as a separate product.

The storage medium may be a read-only memory, a magnetic disk, or an optical disk.

The foregoing is only a preferred embodiment of the present application and is not intended to limit the present application, and any modifications, equivalent substitutions, improvements, and the like within the spirit and principles of the present application are intended to be included in the scope of protection.

We claim:

1. A method for a vehicle to everything (V2X) communication performed by a user equipment (UE) in a wireless communication system, the method comprising:

receiving configuration information on carriers and resource pools associated with the carriers;

identifying at least one carrier for at least one sidelink channel and at least one resource pool associated with the at least one carrier based on the configuration information;

determining an order of the at least one carrier according to a decreasing order based on a highest priority of a sidelink traffic channel;

determining at least one candidate resource from the at least one resource pool associated with the at least one carrier according to the determined order; and selecting an available resource from the at least one candidate resource based on capability information of the UE, wherein the capability information includes information on supported carrier combinations for the V2X communication.

2. The method of claim 1, wherein identifying the at least one carrier for the at least one sidelink channel further comprises:

determining a carrier of which a channel busy ratio (CBR) is below a configured threshold as one of at least one candidate carrier for the at least one sidelink channel.

3. The method of claim 2, wherein identifying the at least one carrier for the at least one sidelink channel further comprises:
selecting, from among the at least one candidate carrier, the at least one carrier for the at least one sidelink channel based on an order of the CBR from a smallest CBR.

4. The method of claim 1, further comprising:
transmitting a data on a sidelink channel based on the selected available resource.

5. A user equipment (UE) for a vehicle to everything (V2X) communication in a wireless communication system, the UE comprising:
a transceiver; and
a controller configured to:
receive, via the transceiver, configuration information on carriers and resource pools associated with the carriers,
identify at least one carrier for at least one sidelink channel and at least one resource pool associated with the at least one carrier based on the configuration information,
determine an order of the at least one carrier according to a decreasing order based on a highest priority of a sidelink traffic channel,
determine at least one resource from the at least one resource pool associated with the at least one carrier according to the determined order, and
select an available resource from the at least one candidate resource based on capability information of the UE,
wherein the capability information includes information on supported carrier combinations for the V2X communication.

6. The UE of claim 5, wherein, to identify the at least one carrier for the at least one sidelink channel, the controller is further configured to:
determine a carrier of which a channel busy ratio (CBR) is below a configured threshold as one of at least one candidate carrier for the at least one sidelink channel.

7. The UE of claim 6, wherein, to identify the at least one carrier for the at least one sidelink channel, the controller is further configured to:
select from among the at least one candidate carrier, the at least one carrier for the at least one sidelink channel based on an order of the CBR from a smallest CBR.

8. The UE of claim 5, wherein the controller is further configured to:
transmit, via the transceiver, a data on a sidelink channel based on the selected available resource.

* * * * *